US010762114B1

(12) United States Patent
Annunziata et al.

(10) Patent No.: US 10,762,114 B1
(45) Date of Patent: Sep. 1, 2020

(54) ECOSYSTEM FOR PROVIDING RESPONSES TO USER QUERIES ENTERED VIA A CONVERSATIONAL INTERFACE

(71) Applicant: X MOBILE CO., New York, NY (US)

(72) Inventors: Vincent Annunziata, Greenwich, CT (US); Gregory Stacey, Greenwich, CT (US)

(73) Assignee: X MOBILE CO., New York, NY (US)

( * ) Notice: Subject to any disclaimer, the term of this patent is extended or adjusted under 35 U.S.C. 154(b) by 0 days.

(21) Appl. No.: 16/664,259

(22) Filed: Oct. 25, 2019

Related U.S. Application Data

(60) Provisional application No. 62/845,450, filed on May 9, 2019, provisional application No. 62/751,144, filed on Oct. 26, 2018.

(51) Int. Cl.
| | | |
|---|---|---|
| *G06F 16/332* | (2019.01) | |
| *G06F 3/0482* | (2013.01) | |
| *G06F 16/33* | (2019.01) | |
| *G06F 9/54* | (2006.01) | |
| *G06F 40/237* | (2020.01) | |

(52) U.S. Cl.
CPC ........ *G06F 16/3329* (2019.01); *G06F 3/0482* (2013.01); *G06F 9/54* (2013.01); *G06F 16/3344* (2019.01); *G06F 40/237* (2020.01)

(58) Field of Classification Search
CPC .............. G06F 16/3329; G06F 40/237; G06F 16/3344; G06F 3/0482; G06F 9/54
USPC ........................................ 707/706, 722, 771
See application file for complete search history.

(56) References Cited

U.S. PATENT DOCUMENTS

| | | | | |
|---|---|---|---|---|
| 9,613,317 | B2 * | 4/2017 | Beamon | G06N 20/00 |
| 9,720,964 | B1 * | 8/2017 | Hansen | G06Q 30/0201 |
| 2001/0034688 | A1 | 10/2001 | Annunziata | |
| 2006/0293940 | A1 * | 12/2006 | Tsyganskiy | G06Q 30/0201 705/7.29 |
| 2008/0182599 | A1 * | 7/2008 | Rainisto | H04M 1/72563 455/466 |
| 2008/0215477 | A1 | 9/2008 | Annunziata | |
| 2009/0070099 | A1 * | 3/2009 | Anisimovich | G06F 40/30 704/5 |
| 2009/0182549 | A1 * | 7/2009 | Anisimovich | G06F 40/30 704/4 |

(Continued)

*Primary Examiner* — Phong H Nguyen
(74) *Attorney, Agent, or Firm* — Gottlieb, Rackman & Reisman, P.C.

(57) ABSTRACT

An ecosystem can be used for processing user questions and commands received via a conversational interface in a hierarchical permissioning manner. The questions and commands which a user is permissioned to ask/issue are determined at user logon. The ecosystem may be configured to access and return appropriate answers from a variety of sources, but only for questions which the user is permissioned to ask. In addition, the ecosystem can be configured to execute commands which may be received by the user via the conversational interface, but only for the commands which the user is permissioned to issue.

The ecosystem may include a computer system configured to receive a text query representing a question asked from the user, score the questions which the user is permissioned to ask, select a high-scoring question, use an API to receive information responsive to the high-scoring question, and output the answer to the user.

30 Claims, 32 Drawing Sheets

(56) References Cited

U.S. PATENT DOCUMENTS

| | | | |
|---|---|---|---|
| 2011/0055191 A1* | 3/2011 | Bain | G06F 16/83 |
| | | | 707/706 |
| 2011/0112952 A1 | 5/2011 | Annunziata et al. | |
| 2011/0173114 A1 | 7/2011 | Annunziata | |
| 2014/0136519 A1* | 5/2014 | Latzina | G06F 16/951 |
| | | | 707/722 |
| 2014/0297571 A1* | 10/2014 | Beamon | G06N 20/00 |
| | | | 706/12 |
| 2016/0019299 A1* | 1/2016 | Boloor | G06F 16/36 |
| | | | 705/3 |
| 2016/0132590 A1* | 5/2016 | Byron | G06F 16/3344 |
| | | | 707/734 |
| 2016/0148097 A1* | 5/2016 | Genova, III | G06F 3/0484 |
| | | | 706/47 |
| 2016/0180333 A1* | 6/2016 | Leyva | G06Q 20/363 |
| | | | 705/41 |
| 2017/0193174 A1* | 7/2017 | Allen | G06F 40/279 |
| 2018/0005293 A1* | 1/2018 | Adams | G06F 16/90335 |

\* cited by examiner

QATABLES

| id | collection id | company id | frequency | json | multiple step | one step answer id | use pin code |
|---|---|---|---|---|---|---|---|
| 811 | 45 | 1 | 221 | {"task":"Wine Search","leaf":true,"answerid":1561,"children":[],"picture":""} | 0 | 1561 | 0 |

FIG. 5

QALIASES

| id | question alias str | Q id | group id | company id | is question |
|----|--------------------|------|----------|------------|-------------|
| 3175 | Wine Search | 811 | 45 | 1 | 1 |
| 3176 | wine | 811 | 45 | 1 | 0 |
| 3541 | search wine | 811 | 45 | 1 | 0 |
| 3542 | search wines | 811 | 45 | 1 | 0 |

FIG. 6

APIS

| id | api str | company id | output file str | output type | url | descript | prefix | multi row | frequency |
|---|---|---|---|---|---|---|---|---|---|
| 192 | WineList | 1 | | 0 | https://sampleAPI.net/mistro/1/wineRatings? | | | 1 | 0 |

| userrelated | dosendjson | json result path | substitute input tokens | http verb | version | request type | link to api | linked api id | input json | output json |
|---|---|---|---|---|---|---|---|---|---|---|
| 0 | 0 | | off | GET | 2 | Form Variables | 0 | 0 | null | null |

FIG. 7

ANSWERSTRINGS

| id | created at | updated at | deleted at | answer string |
|---|---|---|---|---|
| 1561 | 10/5/2018 11:40 | 3/21/2019 12:16 | NULL | Here are your wine operation results.[//Wine results/2//703/ill//WineGrapes//0//981//] |

FIG. 8

APIANSWER

| api id | answerstring id |
|---|---|
| 192 | 1561 |

FIG. 9

INPUTTOKENS

| id | api id | input token str | input token type | length | example | description | order | full set | csv id |
|---|---|---|---|---|---|---|---|---|---|
| 889 | 192 | country | String | 255 | US | Please enter the producing country | 889 | 0 | 752 |
| 890 | 192 | province | String | 255 | Oregon | Please enter the producing province or state | 890 | 0 | 0 |
| 891 | 192 | variety | String | 255 | merlot | Please enter grape variety | 891 | 0 | 753 |
| 892 | 192 | point min | Int | 10 | 93 | Please enter the minimum point rating | 892 | 0 | 0 |
| 893 | 192 | price max | Int | 10 | 15 | Please enter maximum price in dollars | 893 | 0 | 0 |
| 894 | 192 | sort | String | 255 | points | Please enter sort column | 894 | 0 | 770 |
| 1000 | 192 | winery | String | 255 |  | Please enter winery | 1000 | 0 | 0 |

FIG. 10A

INPUTTOKENS (CONT)

| use defaults | entity group id | is optional | display optional | check valid | api default | json path | cond. path | cond. operator | cond. value | prompt text | api map |
|---|---|---|---|---|---|---|---|---|---|---|---|
| 1 | 46 | 1 | 0 | 0 | | | | | | Enter the producing country | |
| 1 | 47 | 1 | 0 | 0 | | | | | | Enter the producing province or state | |
| 1 | 48 | 1 | 0 | 0 | | | | | | Enter grape variety | |
| 0 | 0 | 0 | 0 | 0 | | | | | | Enter the min point rating | |
| 0 | 0 | 0 | 0 | 0 | | | | | | Enter max price in dollars | |
| 0 | 55 | 0 | 0 | 0 | | | | | | Enter sort column | |
| 0 | 60 | 1 | 0 | 0 | | | | | | Enter winery | |

FIG. 10B

TOKENRECORDS

| id | token name | token symbol | token csv id |
|---|---|---|---|
| 1686 | argentina | Argentina | 209 |
| 1687 | argentinian | Argentina | 209 |
| ... | | | |
| 1709 | us | US | 209 |
| 1710 | united states | US | 209 |
| ... | | | |
| 1717 | kiwi | New Zealand | 209 |
| 1718 | portuguese | Portugal | 209 |
| 1719 | south african | South Africa | 209 |
| 1720 | spanish | Spain | 209 |
| 1721 | swiss | Switzerland | 209 |
| ... | | | |
| 1735 | alsace white blend | Alsace white blend | 210 |
| 1777 | cabernet | Cabernet | 210 |
| 1992 | merlot | Merlot | 210 |
| ... | | | |
| 2980 | december | 12/1/2018 | 220 |
| ... | | | |

FIG. 11

TOKENS

| id | token str | token func | company id | category id | token content | description | token csv id |
|---|---|---|---|---|---|---|---|
| 752 | WineCountryAlias | 3 | 1 | 22 | C:\Makepath\wineCountryAlia.csv | | (209) |
| 753 | WineVarietyAlias | 3 | 1 | 22 | C:\Makepath\winevarietyalias.csv | | 210 |
| 770 | VinDatesCSV1 | 3 | 1 | 22 | C:\Makepath\VinDatesCSV1.csv | VinDatesCSV1 | 220 |

FIG. 12

CLASSIFIERS

| id | created at | updated at | deleted at | name | question id |
|---|---|---|---|---|---|
| 3668 | 9/11/2019 12:27 | 9/11/2019 12:27 | NULL | find wines | 811 |
| 3669 | 9/11/2019 12:27 | 9/11/2019 12:27 | NULL | search wines | 811 |
| 3670 | 9/11/2019 12:27 | 9/11/2019 12:27 | NULL | wine | 811 |
| 3671 | 9/11/2019 12:27 | 9/11/2019 12:27 | NULL | search wine | 811 |

FIG. 13

ENTITYVALUES

| name | entity_group_id |
|---|---|
| argentina | 46 |
| argentinian | 46 |

....

| us | 46 |
| united states | 46 |

....

| kiwi | 46 |
| portuguese | 46 |
| south african | 46 |
| spanish | 46 |
| swiss | 46 |

....

| alsace white blend | 48 |
| cabernet | 48 |
| merlot | 48 |

ENTITYGROUPS

| id | name | company id | active |
|----|------|------------|--------|
| 46 | WineCountries | 1 | 1 |
| 47 | WineRegion | 1 | 1 |
| 48 | WineVarieties | 1 | 1 |
| 55 | VinDates2 | 1 | 0 |
| 60 | Winery | 1 | 1 |

FIG. 15

OUTPUTTOKENS

| id | api id | output token str | output token type | description | order | example | length | format | json path |
|---|---|---|---|---|---|---|---|---|---|
| 2047 | 192 | country | 2 | country | 2047 | US | 64 | | |
| 2048 | 192 | province | 2 | province | 2048 | Oregon | 64 | | |
| 2049 | 192 | region 1 | 2 | region 1 | 2049 | | 64 | | |
| 2050 | 192 | region 2 | 2 | region 2 | 2050 | | 64 | | |
| 2051 | 192 | winery | 2 | winery | 2051 | | 64 | | |
| 2052 | 192 | designation | 2 | designation | 2052 | | 64 | | |
| 2053 | 192 | variety | 2 | variety | 2053 | | 64 | | |
| 2054 | 192 | title | 2 | title | 2054 | | 64 | | |
| 2055 | 192 | points | 2 | points | 2055 | | 64 | 0,000 | |
| 2056 | 192 | price | 2 | price | 2056 | | 64 | 0,000 | |
| 2057 | 192 | taster name | 2 | taster name | 2057 | | 64 | | |
| 2058 | 192 | taster twitter handle | 2 | taster twitter handle | 2058 | | 64 | | |
| 2059 | 192 | description | 2 | description | 2059 | | 64 | | |
| 2060 | 192 | link | 2 | link | 2060 | | 64 | | |

| Question Details | |
|---|---|
| Testing| | A Edit answer |
| Questions | Wine Search |
| Wine Search | |
| ☐ Use Context | |
| ☐ Use Pin Code | ☑ Use Form Entry |
| ALIAS PHRASES | Labels |
| New Question Phrase  Add  Delete | New Label Phrase  Add  Delete |
| ⊕ Export Selected Records | ⊕ Export Selected Records |
| ☐ Phrase | ☐ Label |
| ☐ wine | ☐ find wines |
| ☐ search wine | ☐ search wines |
| ☐ search wines | ☐ wine |
| | ☐ search wine |
| back | save |

| Select API below to create Input Token defaults and add Output T... | | |
|---|---|---|
| API | | |
| WineList | | |
| API list - Choose an API below to include within your Answer. ~2110 | | |
| ☐ API | Description | Company |
| ☐ show user vocabulary by us... | show user vocabularies by u... | NewCo |
| ☐ update user vocabulary | update user vocabulary in d... | NewCo |
| ☐ Delete user vocabulary | Delete user vocabulay in da... | NewCo |
| ☐ Question Suggestions | AI response to missed quest... | JitterbitCo |
| ☑ WineList | WineList | Venus |

FIG. 21B

| API Input Token Defaults | API Output Tokens available for Answer | | |
|---|---|---|---|
| Input Token | API Name | API ID | Description | Default |
| sort | WineList | 192 | Please e... | points |
| price_max | WineList | 192 | Please e... | |
| point_min | WineList | 192 | Please e... | |

ECOSYSTEM FOR PROVIDING RESPONSES TO USER QUERIES ENTERED VIA A CONVERSATIONAL INTERFACE

CROSS-REFERENCE TO RELATED APPLICATIONS

This application claims priority under 35 U.S.C. § 119 to U.S. Provisional Application No. 62/751,144, filed with the U.S.P.T.O. on Oct. 26, 2018, and to U.S. Provisional Application No. 62/845,450, filed with the U.S.P.T.O. on May 9, 2019, the disclosures of which are incorporated by reference herein in their entireties.

TECHNICAL FIELD

The present invention relates to a system and method that provides an ecosystem for processing user questions received via a conversational interface and accessing and returning appropriate answers from a variety of sources.

BACKGROUND

Businesses around the world largely consume a large amount of data and companies typically have a multitude of systems that are utilized by their employees to retrieve, view, analyze, manipulate, and/or enter data. It is not uncommon for a single user to utilize anywhere between half a dozen and a dozen separate applications each day for these purposes. Moreover, in many cases, desired information is only available through a distributed network of different types of data sources, fees, or repositories. These are often located on remote sources accessible through the internet, each having its own particular protocol for data access and retrieval. For companies involved in the financial industry, an employee may need to retrieve information from and multiple disparate market data sources, various online trading platforms and exchanges, news feeds, and even weather, traffic data, and various historical records. As a result, users must manually hunt for data or access and/or input data on multiple systems in various formats. This reduces efficiency and can introduce other issues as well.

The need to utilize a multitude of systems for unique and at times similar data also has problems because the same data item may be referred to differently on different platforms. As a result, each user must know the appropriate key words for the platform. This is a particularly acute issue in the financial services industry where users can be forced to manually work with and remember multiple different codes to reference the same instrument on different systems. For example, on one platform a commodity may be referred to as "West Texas Intermediate" while on others the same commodity is WTI, TI, or even CL. Similar issues exist for more mundane data fields, such as the date format (e.g., Mar-17, Mar17, March 2017, March-17, H17, 2017-03, Red March, Blue March, etc.) The user workflow fragmentation resulting from multiple applications, interfaces and syntaxes creates organizational inefficiencies increasing workloads and distracting employees from their core responsibilities. Similar differences may exist between companies. For example, two different companies (or even different departments or employees) may internally refer to the same commodity using different terminology. Combined, these disparities introduce many inefficiencies and opportunities for error.

The issues above are further magnified when user input to a data query system is provided by audio input and is processed using a speech recognition system. While audio input systems allow for rapid user input without a keyboard, speech recognition systems are prone to transcriptions errors, particularly where the speaker may have an accent that the system is not trained specifically to address.

Accordingly, there is a need for an improved method and system for processing user input that will allow users at various companies to access a variety of data sources through a conversational interfaces and without the need for the user to specifically select the source from which the requested data will be retrieved.

There is a further need for a query based data access system that can efficiently process user input queries to identify the particular data source corresponding to the query, forward the query in the proper format to the source of the data, and then retrieve and present the results in an appropriate format.

While an organization may have access to a large number of data sources, it may restrict access to these based on a user's authority level. There is a further need for such a system to efficiently process user input queries in a manner that accounts for restrictions not only in which data sources a user may query but on which queries can be made for that source.

SUMMARY

These and other issues are addressed using a method and computer system that provides an ecosystem for providing information to a user. In an embodiment, a text query is received that is associated with a user question. The text query is assessed against a predefined set of questions for which answers can be provided to the user. The predefined question sets can be defined hierarchically, such as based on the identity of the user and the company they work for. Thus, a company may need to be authorized to access a collection of questions and specific users at that company may be authorized to access subsets of the company's question collections. Each company can define its own ecosystem of question collections with related data, perhaps based on a master question set from the service provider. Collections can be shared so that a first company, for example, can selectively allow a second company to one or more of its collections.

During question processing, the text query is compared to text of questions in a set of predefined questions to determine a string match score. Each question may have an associated API that provides access to a source of data from which an answer to the question can be retrieved. Data in the text query is used to determine an API score for each authorized question based on attributes of the APIs that are associated with the questions in the predefined set of questions. API attributes can include required and optional input tokens for the API. The question in the predefined set of questions most likely to be the one asked by the user is selected based on the string matching and API matching scores.

If the string matching and API matching processes do not identify a single possible matching question, a list of potential matching questions can be presented to the user.

Once a matching question has been selected, a data request is issued to the API for the matching question. Token values for the data request can be extracted from the text query. Default values can also be defined, such as on a hierarchical basis. A response from the API is processed to extract the relevant data and an answer that includes at least some of the returned data from the API is prepared and output to the user.

String matching and API matching can be done sequentially, with API matching performed if a matching question is not found in string matching. The matching processes can also be executed concurrently and priority given to the first to match or to the type of match, such as relying on string matching unless there are no string matching scores greater than a threshold and then relying on API matching. Input question matching efficiency is improved by analyzing input only against those questions that the particular user is authorized to ask and through the use of the dual string matching and API matching processes to select an authorized question that matches a user input.

In an embodiment, the predefined set of questions can be a subset of a master set of questions and a variety of different sets of questions can be defined and access to particular question sets granted on a hierarchical basis, such as to particular companies, departments, and specific users. In a particular embodiment a first subset of questions can be defined on a company wide basis and a second subset of questions, which is a subset of the first, defined on a department or user basis.

In addition, access to the different APIs that the system is configured to utilize may also be granted on a hierarchical basis, such as to particular companies, departments, and specific user. For example, a particular company which subscribes to the ecosystem may have access to a first set of APIs from a master set of APIs that the system is configured to utilize (the first set of APIs may include all or fewer than the APIs included in the master set), an administrator-level user associated with the company may have access to the first set of APIs, or to a second set of APIs which includes fewer than all of the APIs included in the first set. In addition, a non-administrator-level user associated with the company may be permissioned access to the second set of APIs, or to access a third set of APIs which includes fewer APIs than the second set.

Further, access to APIs can be shared on a permission-based access between different companies.

In an embodiment, in addition to a primary text phrase for a question, alternative alias words and phrases for that question can also be defined. The string matching process compares the user question input against both the primary text phrase and any defined alternatives when generating a string matching score.

In an embodiment, each API that is used to access a respective data source includes data identifying input tokens that are required, input tokens that are optional, a format for issuing an API query to the respective data source, and information allowing data to be extracted from a response to an API query.

In an embodiment, a predefined set of valid input values can be defined for respective input tokens for APIs. During API matching, the question text can be compared to the valid input token values to determine if there is a potential match to the token value. An API score for an API for a given user question text can be based on scoring parameters including a number of matching input tokens, a number of unmatched tokens, a number of unused tokens, or other factors. Other scoring parameters can include matches between the user question text and labels that are specified for respective APIs, and historical data reflecting frequencies of various questions being asked, such as by day of week, time of day, and hierarchically by user, company, etc.

In an embodiment, efficiency is further improved by generating for a user in advance of them asking a question a subset of data identifying the particular questions for which they are allowed to ask and various attributes of those questions and the APIs for those questions. These data subsets can be accessed as appropriate during string matching and API matching in lieu of accessing the larger database records that also contain information related to questions the user is not allowed to ask.

When a matching question has been found but there is missing data for required input tokens the user can be asked to provide that data. Historical and other data can also be used to suggest possible values. In addition, a question or API can be flagged to require additional security and, in such a case, the user is required to provide appropriate security checks, such as by entering a password, providing biometric data (e.g., iris scan, fingerprint, etc.), before the API call is executed.

In an embodiment a predictive input display is presented to solicit data for the missing tokens. The input display includes a data input field, a first user input interface displaying for selection a first set of input options, a second user input interface displaying for selection a second set of input options, and a third user input interface displaying for selection a third set of input options. The first set of user input options comprises inputs in the historic record most frequently entered by the user. The second set of user input options comprises inputs in the historic record not in the first set of user input options, but which can also be considered likely options based on historic data. The third set of input options can comprise options for user input independent of the historic record, such as a list of all valid input values. If there are more than one token for which an input value is needed, several predictive input displays can be presented and the options from which a user can select via a predictive input display for one token can be dependent on a value selected by the user for a different token. It is clear that since the options presented in the predictive input displays may be based on the historic record and/or by a value selected by the user for a different token, users at the same company as well as users of different companies may obtain different predicted input values for the same question asked.

According to an embodiment, various vocabulary libraries are provided and can be applied to a raw user input question before it is analyzed to identify a matching question. The vocabulary libraries can be defined on a hierarchical basis, such as by company and user, and reflect company-specific jargon, acronyms, and other text which is used internally but may not match standard terminology. Common errors, such as typical misspellings, typos, and transcription errors from voice-to-text system can also be included.

In an embodiment, a question playlist can be defined that includes one or a plurality of predefined text queries. When a playlist is activated, the predefined text queries in the playlist are processed as if they were questions directly input by the user. The playlist entries can be executed concurrently, sequentially, or in a combination. A playlist can be activated manually, in response to a user input processed by the present system and method, in response to a triggering event, or by other means.

Various databases can be used to store the question, API, vocabulary, and other data used during system operation. A particular database architecture that provides improved flexibility and performance is disclosed herein.

The present system and method can be implemented in a centralized or distributed computer system and made accessible to users over a network, such as a LAN, WAN, or the internet. In one embodiment, the primary system is hosted on a remote server with master system databases. System customer, such as companies, can access the system using a local computer and user devices and may have local database(s) that contain company or user-specific data and may also replicate some data from the master databases.

Software for implementing the system can be stored on electronic media and made available for download an installation on various devices. The system software can be distributed to customers. Some or all of the system can be implemented over a network using a software-as-a-service implementation wherein only limited software and data would be needed for any particular installation.

BRIEF DESCRIPTION OF THE DRAWINGS

The above and other features of the present invention will become more apparent by describing in detail exemplary embodiments thereof in conjunction with the accompanying drawings, in which:

FIGS. 5-16 are example tables of the various data objects in the database architecture of FIGS. 4A-4D;

FIGS. 19A and 19B show the configuration of predictive data input screens according to an embodiment;

FIG. 20 illustrates an exemplary question details screen for defining and editing questions and related information according to an embodiment;

FIGS. 21A-21C illustrate an exemplary Answer details screen for defining and editing Answers and related information according to an embodiment.

FIG. 23 illustrates an exemplary NLP Training Sentences module screen.

DETAILED DESCRIPTION OF THE EMBODIMENTS

Figure 1:
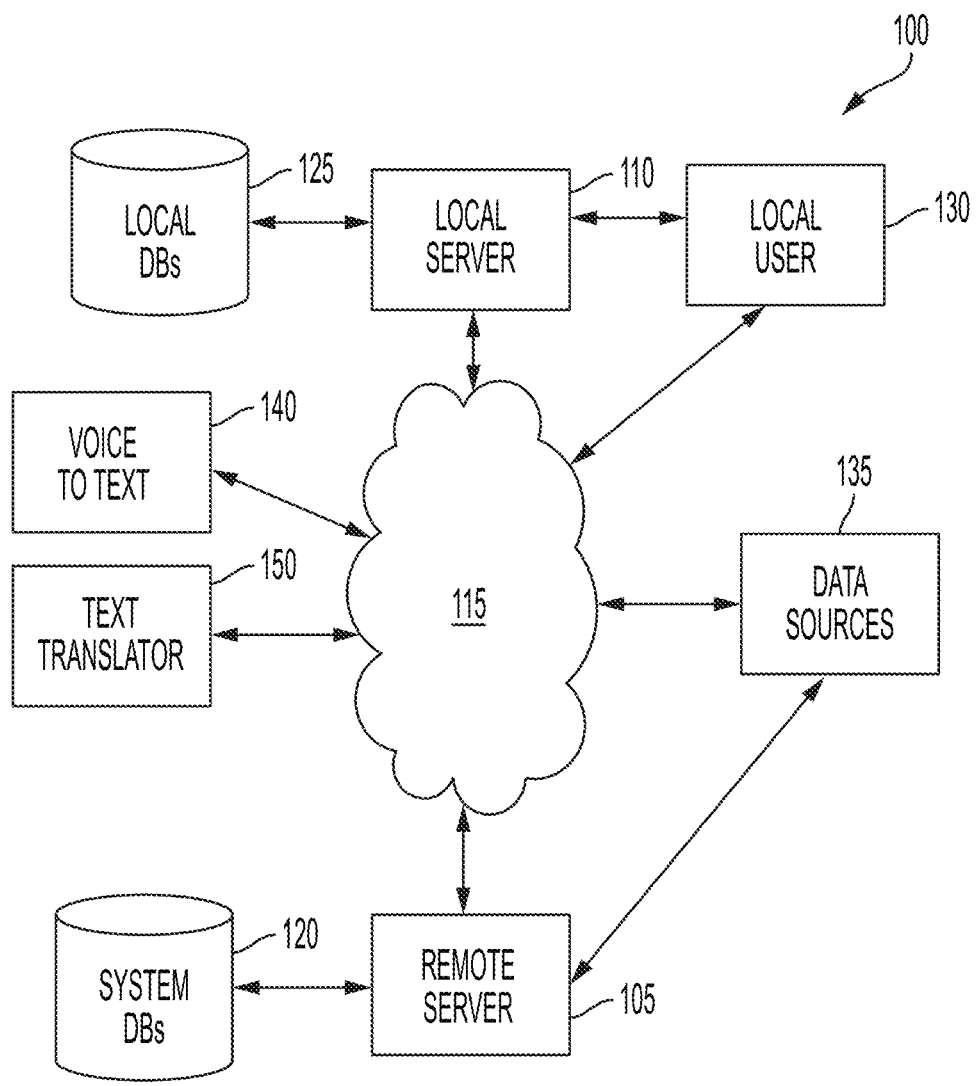
FIG. 1 is a high level diagram of a system for receiving and processing a user question and provided a response.

Exemplary embodiments of the present invention are described more fully hereinafter with reference to the accompanying drawings. The present invention may, however, be embodied in different forms and should not be construed as being limited to the embodiments set forth herein. Like reference numerals may refer to like elements throughout the specification. When an element is referred to as being connected to another element, intervening elements may be connected therebetween. In addition, elements, components, parts, etc., not described in detail with respect to a certain figure or embodiment may be assumed to be similar to or the same as corresponding elements, components, parts, etc., described in other parts of the specification.

Turning to FIG. 1, there is shown a high level diagram of a system 100 for receiving a user query via a conversational input, processing the query to determine a source of responsive data, accessing the source to retrieve such data, and formatting and returning an answer to the user. The system 100 can be implemented in a centralized or distributed configuration. In arrangement of FIG. 1, the system has a remote server 105 which can be used to implement the system and accessed by a local server 110 connected through a network 115, such as the internet or a LAN or WAN system, on a remote server 105. A user can access the system via a local user device 130, such as a PC, tablet, smart phone, smart speaker, or other suitable computer device connected via the network 115 to the remote server 105 directly or through the local server 110.

Various databases may be provided that contain records used for question processing and answer output. As explained in more detail below, the various databases contain information defining permissible questions that can be asked, respective data sources 135 from which data responsive to such questions can be retrieved, and answer formats for the questions. In addition, vocabulary data is provided for use in initial input query processing and in subsequent processing to determine the question asked. Other services used by the system 100 may also be provided and accessed, e.g., via the network 115. Such services include a voice-to-text service 140 and a language translator service 150 for converting text in one language to another.

Although a single network 115 is shown, in practice there may be more than one network at issue. For example, the remote and local servers 105, 110 may be connected via the internet, while the remote server 105 and system databases 120 are connected over a separate LAN or WAN, and may be accessible by the local server 110 through the remote server 105 but not directly.

In one configuration, a system or primary set of master or default databases 120 is associated with the remote server 105. A set of local databases 125 can be associated with the local server 110. The system and local databases 120, 125 can be maintained in a directly connected datastore of the respective server or may be accessible local storage of the server, or accessible over a network, such as network 115 or other LAN or WAN system, such as a cloud-based data storage. In one configuration, the system databases 120 contain all of the master question definitions and related data. Client (company) and user specific data can also be stored in the system databases 120. In another configuration, local databases 125 can be used to store client-specific questions and related data that may duplicate or augment the records maintained at the system databases 120. In a particular configuration, the remote server 105 is controlled by the overall query system service provider and local servers 110 are associated with individual companies that have subscribed to the service. The local databases 125 in this scenario would include data specific to the company.

The questions, APIs, vocabulary, and other aspects can be defined in a hierarchical manner. As to the questions and APIs, a company may have access only to one or more defined sets of questions from the complete set of defined questions, and may have access to one or more sets of APIs from the complete set of APIs that the system is configured to utilize. A given employee at the company can be given permission to ask the system only some of those questions in the collections of a given company. Each company may have its own company-specific and user-specific vocabulary that is used to process queries made to the system.

Figure 2:
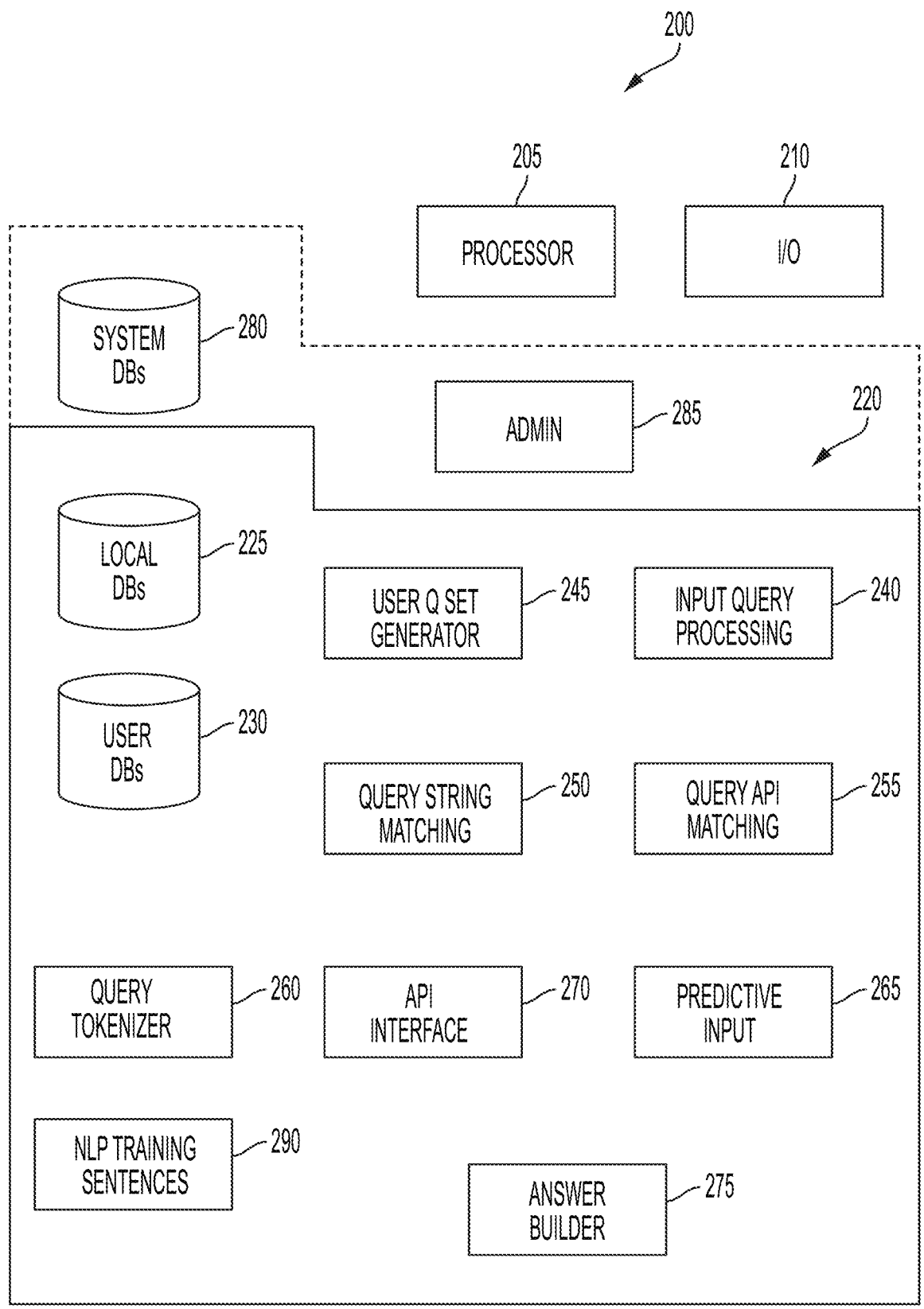
FIG. 2 is a more detailed diagram of the system of FIG. 1.

FIG. 2 is a more detailed, but still high-level diagram of a computer system 200 that implements an embodiment of the invention, such as in the remote server 105 or local server 110. The computer system 200 has at least one processor 205 and a conventional input/output system 210 that allows it to communicate with other devices and users. The processor executes software modules stored in a memory 220 with reference to data stored in one or more databases. If the computer system 200 is a local server 110, the databases may include a local database 225 and a user-specific database 230. A system database 280 (such as located at remote server 105) may also be accessed, e.g., over a network, if necessary records are not available in the local and user databases 225, 230. Memory 220 can be on-board system memory, such as RAM, local data storage, such as digital, magnetic, or optical storage devices, and/or remotely accessed data stores accessed via a network. The various databases may be stored in system RAM, local storage devices, remote storage devices, or a combination thereof. In operation, and as discussed further with reference to the flowcharts of FIGS. 3A and 3B, a user enters a question or request for action and the system responds accordingly when the user is permissioned to ask the question or to perform the requested action. (Questions and requests for action (e.g., a command for performing a given task) are treated by the system in a similar manner). Thus, the discussion herein focuses on addressing user questions. (A similar process is used to address requests for action.) The process as discussed herein focuses in the processing of a single question. The system can be configured to process multiple questions concurrently, e.g., as input by multiple different users. In addition, the system can be configured to process multiple questions included in a playlist (e.g., a list created by a user to contain one or more questions therein). When a playlist includes a plurality of questions, the system can be configured to process all of the playlist questions concurrently in order to present the respective answers to the user as quickly as possible.

Questions (and requests for action) are predefined in the system. Each predefined question may be associated with an API (or a plurality of APIs) providing access to the appropriate data source to retrieve the information needed to answer the respective question. API definitions specify details about accessing the API, such as required and optional input tokens. Thus, some of the predefined questions may be associated with an API, while other predefined questions need not be associated with an API. An example of a question which need not be associated with an API may be, for example, "the joke of the day," the answer to which may be obtained by the system without utilizing an API. In addition, certain commands for performing a given task need not be associated with an API, and can be executed by the system when issued by a user which has permission to issue such command. The question and API definitions can also include additional information used by the system when analyzing the text query to determine which question a user has asked (or has most likely asked).

A wide array of questions can be defined and subsequently asked. Examples include the price of a particular security on a specific exchange, the available capacity of a shipping fleet, the current balance of a corporate bank account, and today's weather. A wide array of requests for action can also be defined. As an example, the user could enter a request to purchase a certain number of shares of a commodity, order a company car, or reserve a conference room.

The initial user question can be input through any appropriate device and the question format can be audio, text, or even detailed on an image. The initial user input is processed by an Input Query Processing module 240 to convert the input into a text query that is subsequently processed. An initial action is to convert non-text input into text, such as by accessing a voice-to-text service for audio input. If the input is a graphic image, a conventional OCR system can be used to extract the text. If the text (as input or via voice-to-text or OCR) input is in a language that is not supported by the system, a translation can be applied to convert the text into the native system language, such as English or other supported language. The voice-to-text, translation, and OCR can be local or remotely located and accessed over the network. A conventional speech-to-text and translation engine, such as Google Voice™ and Google Translate™, can be used. Likewise, conventional OCR software, either local or remote, can be used.

After the initial user input question is converted into a text question, if needed, the input query processing module 240 applies a set of defined vocabulary words and phrases to the text question to generate the actual text query that is subsequently processed. This process converts internal jargon to conventional terminology. The vocabulary can be defined in a hierarchical manner, such as on a company, department, and individual user basis. Vocabulary can also be defined to replace commonly misspelled words with the correct ones and to account for expected misinterpretation issues in voice-to-text systems, a particular problem for users that have heavy accents.

Once the initial input question has been pre-processed to generate a text query, the system analyzes the text query to identify which predefined question it matches or is most likely to match, obtains any additional information from the user needed for the question to be answered, accesses a data source via an appropriate API associated with the question to retrieve data needed (in the case when the question to be answered is associated with an API), and then formats returned data as an answer that can be passed to the user.

In one embodiment, the process of matching a text query to a particular question uses a two-part process. A string matching of the text query against the predefined questions and any defined alternative words or phrases for those questions is performed by a Query String Matching module 250. In addition, an API matching of the text query, as processed by a Query Tokenizer 260, is performed by a Query API matching module 255 against characteristics of the defined API data sources for the defined questions. A natural language processor (NLP) Training Sentences module 290 can be configured to determine PRECURSOR and/or PRETEXT token values as described with reference to FIG. 18.

Once a particular question has been identified as the one asked, the user is asked to provide any additional required or optional inputs needed. A particular Predictive Input module 265 can be used for this process. An API Interface module 270 passes appropriate parameters taken from the text query, default values and/or user input to the appropriate remote data source via the respective API. An Answer Builder module 275 processes returned data to generate an appropriately formatted response to the question.

In an embodiment, the system can also support playlists that contain one or more separate questions. If an input is determined to be a playlist, the individual entries in the playlist are extracted and each entry is processed as if it were a user input. The entries can be processed sequentially, all processed concurrently, or a combination, such as where the answer to one question may depend on the answer to a previous question. Playlists can be selected by a user using various mechanisms or triggered automatically in response to the occurrence of a predefined condition or event such as a given time or date, the opening or closing of an exchange, or other types of trigger conditions or events. A user input to the system may be identified by the system as a request for action, the result of which is to execute a particular playlist.

An administration module 285 allows an operator, through various user input screens, to define and edit system questions, APIs for accessing sources of data to answer questions, local vocabulary words and phrases, and various hierarchical permissions governing access to questions and features related to them. Collections of questions, vocabulary lists, and other materials can also be defined and access rights can be granted on a collection basis.

In other embodiments, the functionality of the various software modules can be combined and/or divided in different manners. Thus, for example, the Matching modules 250, 255 and Query Tokenizer 260 can be combined in a single query text matcher module. Likewise, the API Interface and Answer Builder modules 270 and 275 can be combined. Other arrangements in alternative embodiments are also contemplated.

While the various databases are shown separately in this and other figures, one or more could be combined in a single database accessed locally or via a network. Likewise, each database could be implemented as a collection of databases in a local or distributed arrangement. One particular database record architecture for storing the various types of data referenced by the system is discussed separately below. While the various software modules are shown in a computer system 200, in other embodiments at least some of these modules can be implemented on the remote server 105 and made available as SaaS functionality over the network to the local server 110 or other user device. In one such configuration, the majority of system functionality and relevant databases can be on the remote server 105 and its database system 120, and access by companies and employees of such companies is done over the network 115.

Figure 3A:
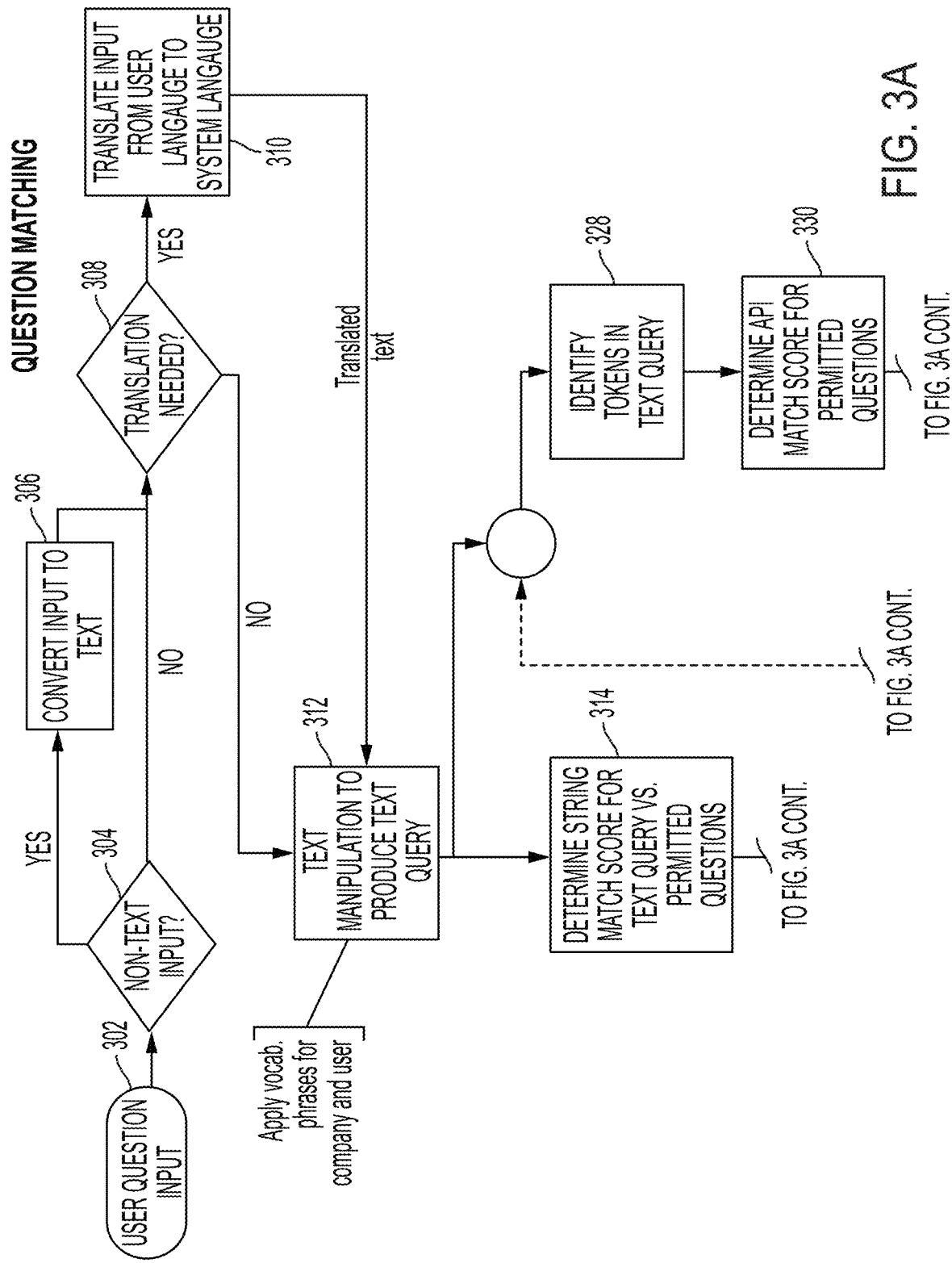
FIGS. 3A and 3B are a high-level flow chart of a method for processing and providing a response to a user's query according to one embodiment.
Figure 3A:
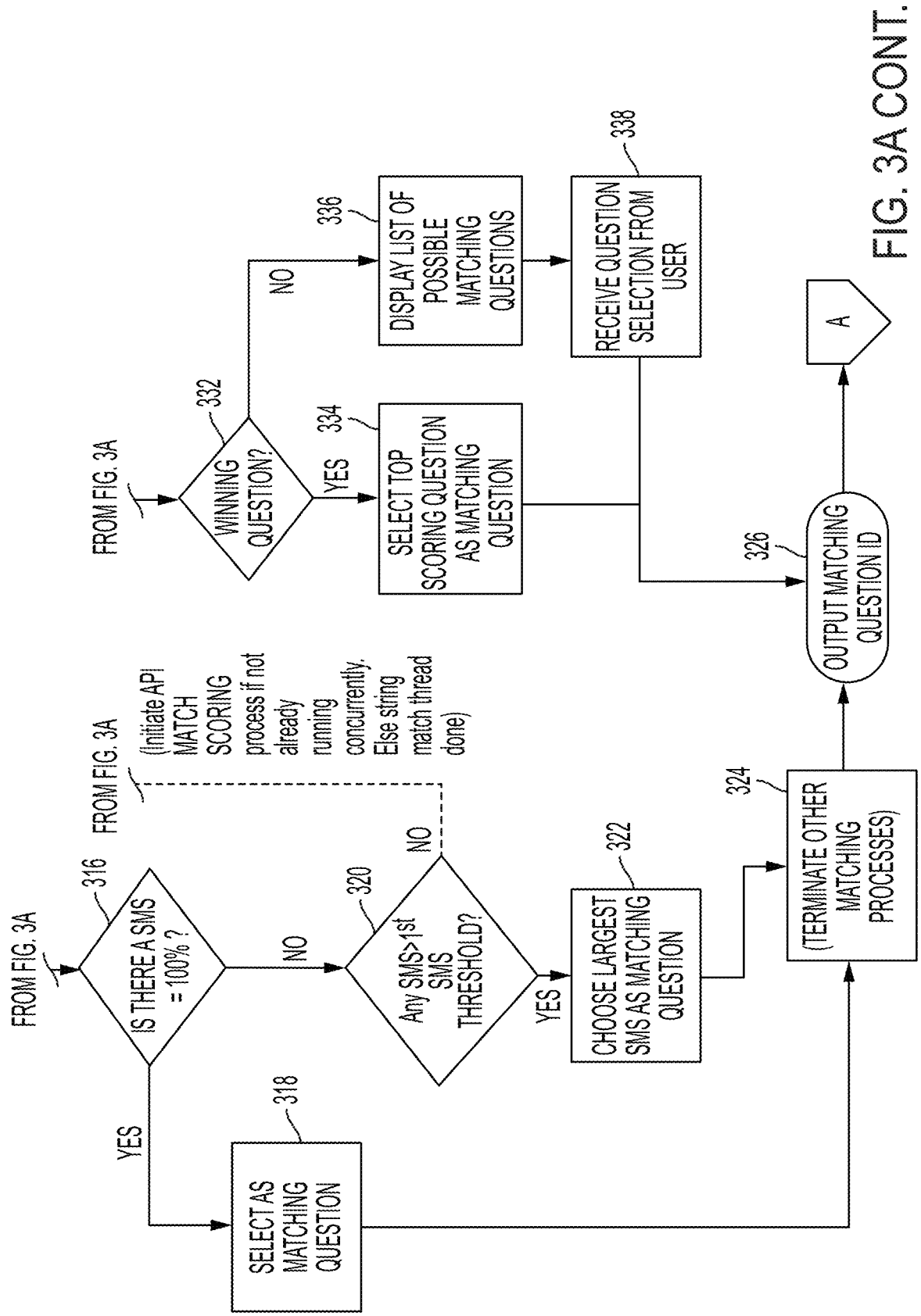
Figure 3B:
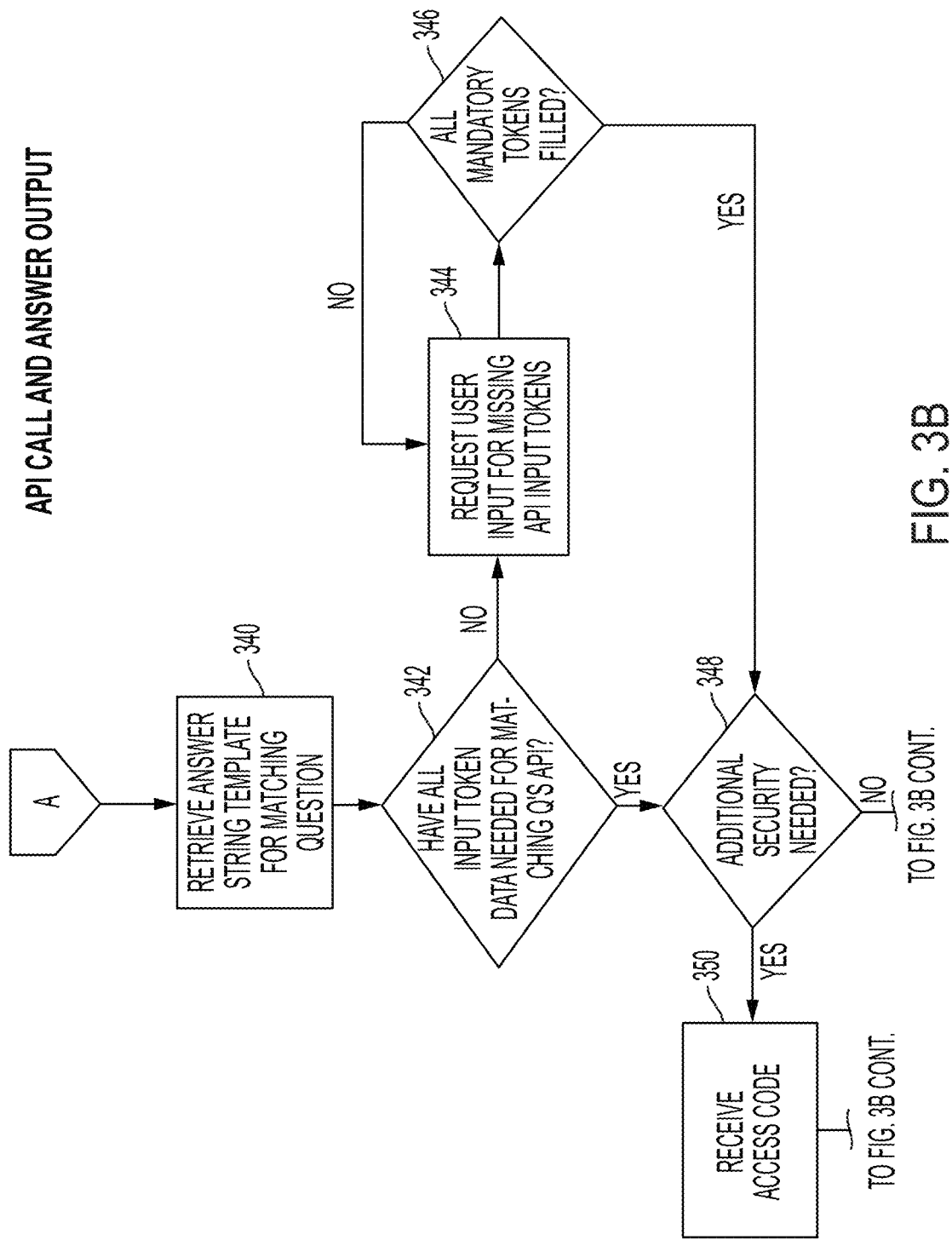
Figure 3B:
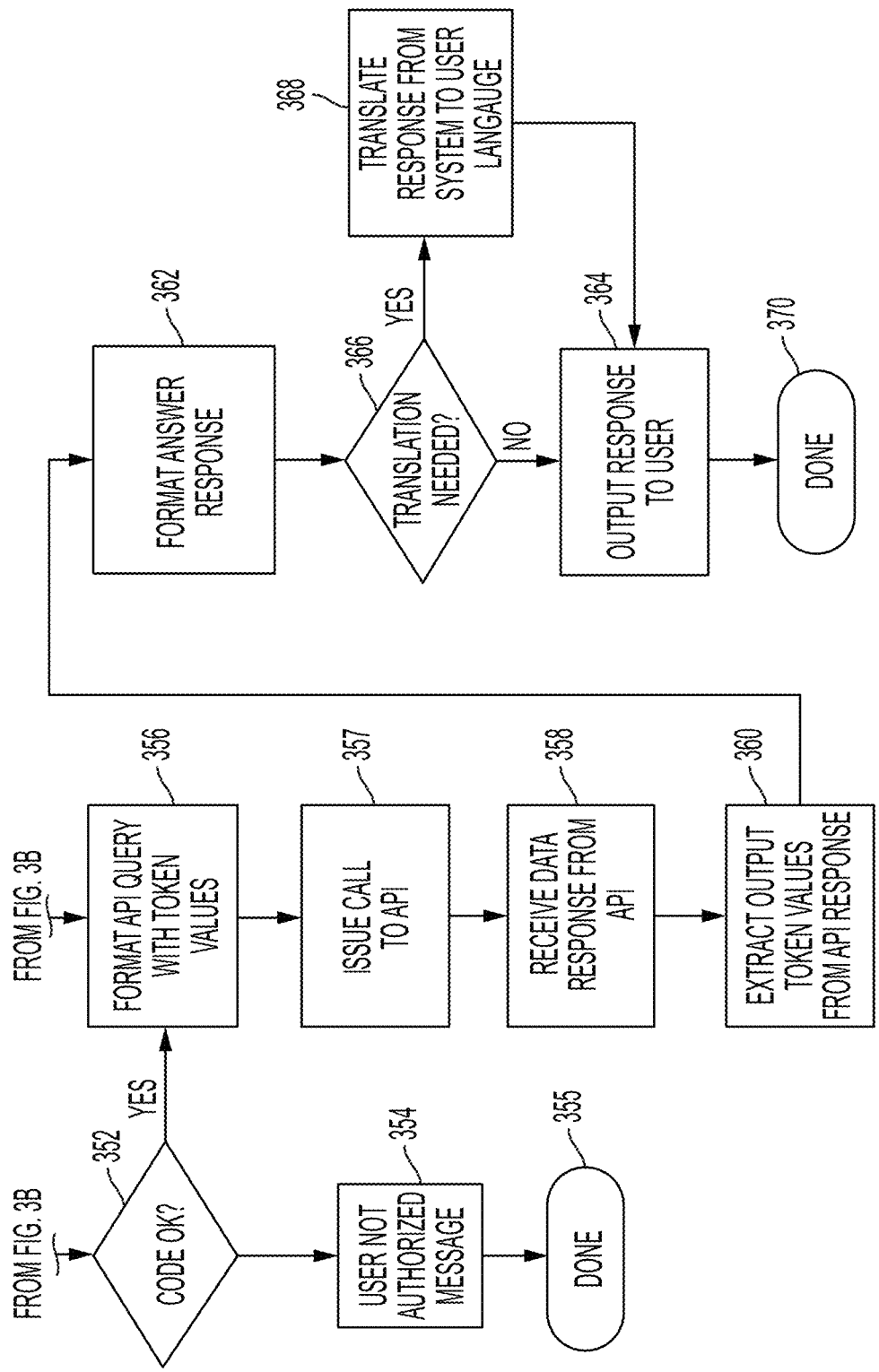
Figure 4A:
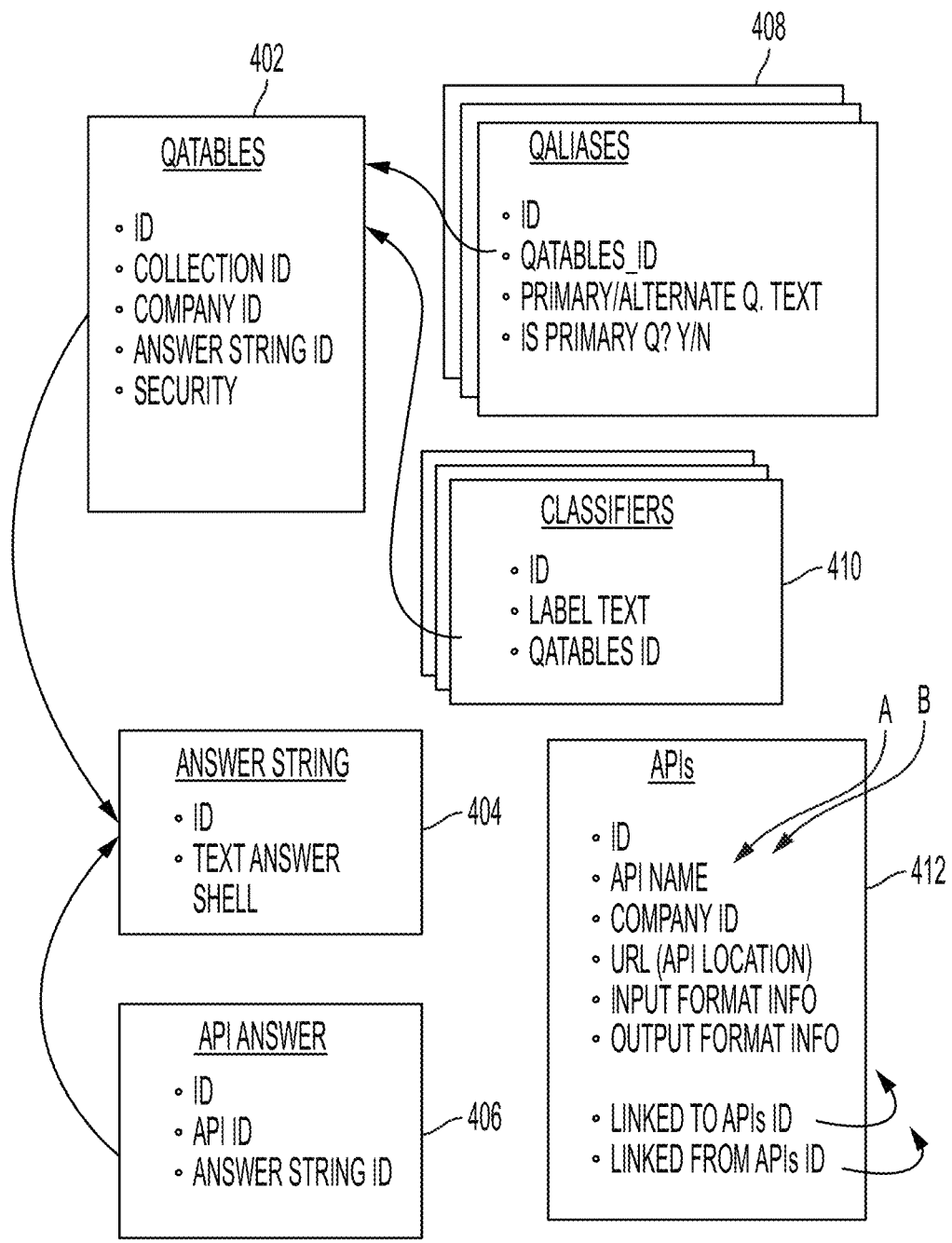
FIGS. 4A-4D illustrate a database architecture for an embodiment of a system implementing the method of FIGS. 3A and 3B.
Figure 4B:
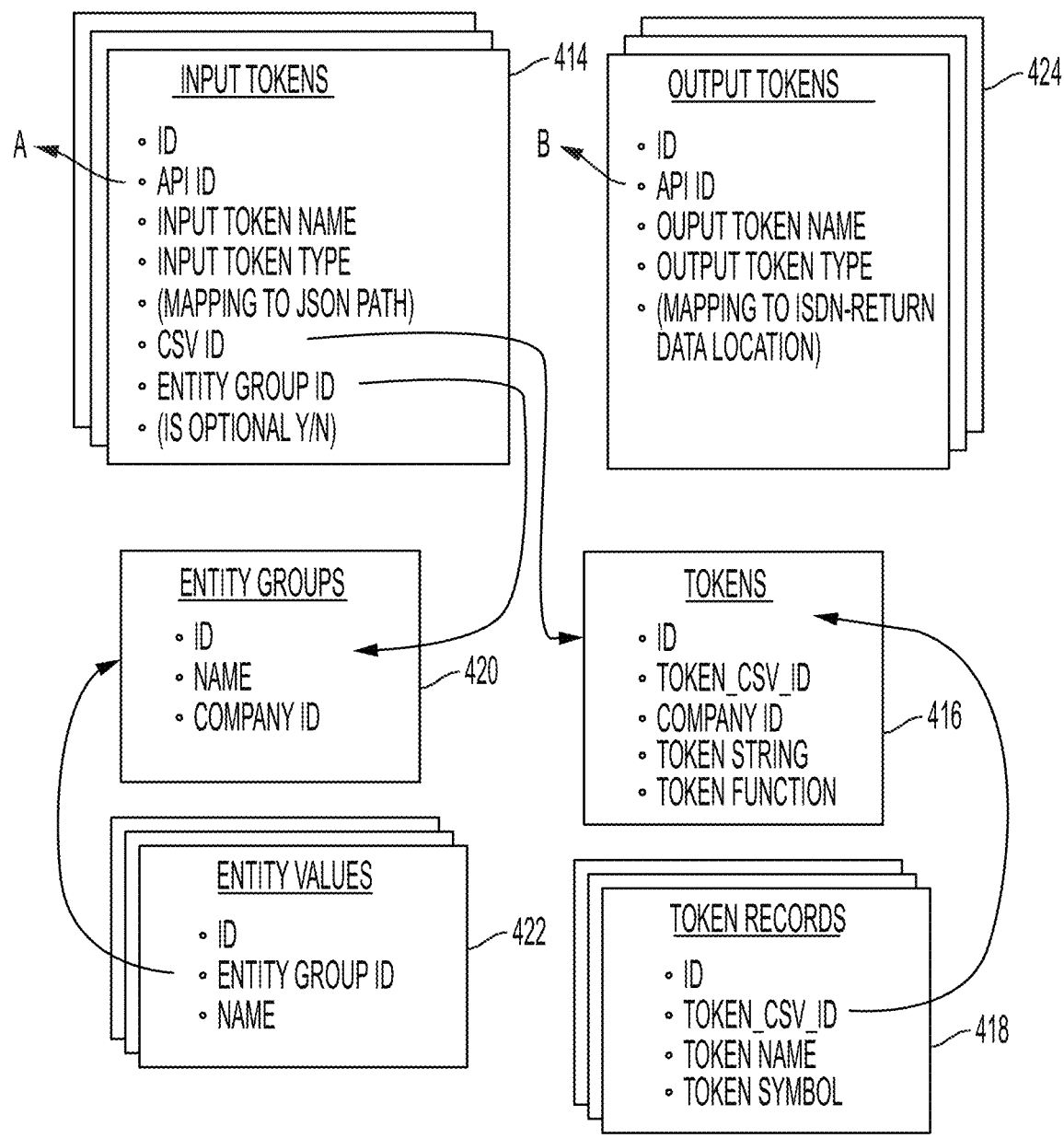
Figure 4C:
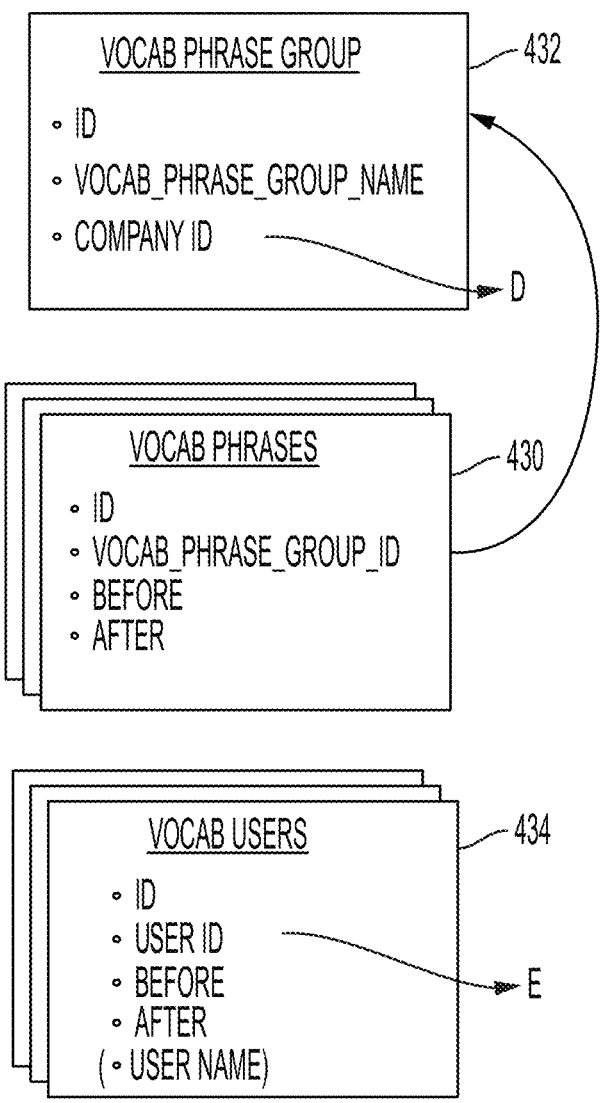
Figure 4D:
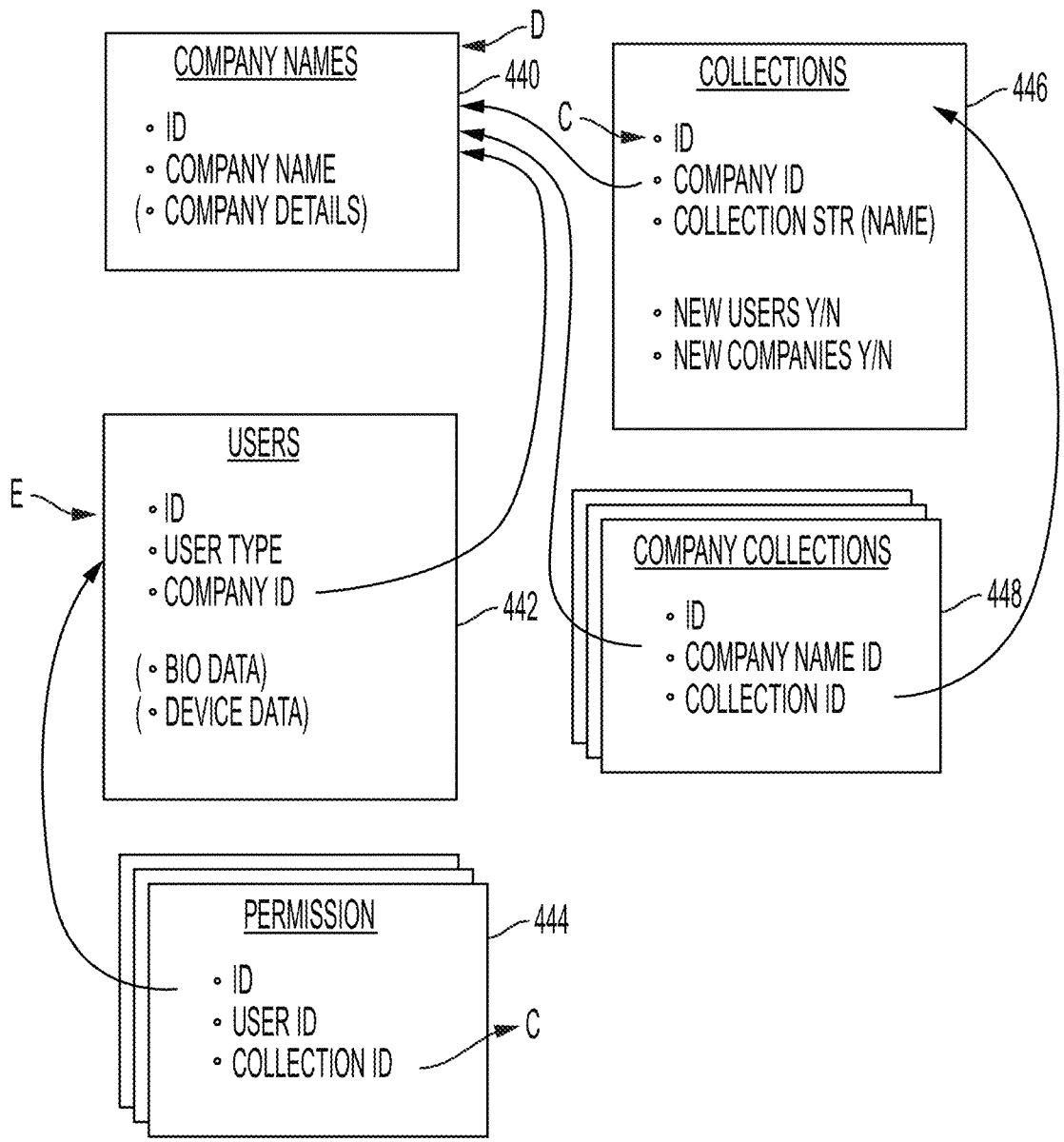

Turning to FIGS. 3A and 3B, there is shown a high-level flow chart of a method for processing and providing a response to a user's query according to one embodiment. The process begins on receipt of a user input query (Step 302). The user query may be a question which seeks an answer, or a command for performing a given task. For example, the user query may be "what is the volume of gold today?" or "new silver order." The query can be entered using any suitable computing device and is processed as appropriate to convert it into a text suitable for subsequent processing. If the input provided is not initially in text format (Step 304), the non-text input is processed as needed (Step 306), such as by executing a voice-to-text for audio input or a text extraction process if the input is an image or other digital file, such as an e-mail, text message, or word processing document. After text data is obtained, if the text is deemed to be in a language not supported by the system (Step 308) a translator can be applied (step 310) to convert the text into an appropriate language for subsequent processing by the system.

Once the text question is available, if desired a custom vocabulary can be applied to the text question to replace various words and phrases in the text question with alternatives. (Step 312). This translation facilitates the use of alternative words and symbols that may be industry, company, department, or user specific terminology, and where such words and symbols can be converted into a standard word or phrase which will then be used during the question matching process. In a simple example, a custom library can specify that "COB" be replaced with "close of business" and "PNL" with "profit and loss". The phrase "Bazrah Light" may, in context of the company be defined to be replaced with "Bazrah Light Crude." The vocabulary lists may be used to correct, for example, an erroneous translation of the speech-to-text engine from "Bazrah Light," as spoken by the user (which relates to petroleum), to "bathroom light," as understood by the speech-to-text engine. The vocabulary libraries can also be used to replace typographical or transcription errors (such as from voice-to-text processing) that have been identified as occurring frequently with the correct word or phrase. Thus, an input text might be "Nap Time" to be replaced with "Naphtha". An input text of "do buy" can be replaced with "Dubai." If a user has a habit of typing "Brentt" instead of "Brent," a user-specific vocabulary entry can also be defined to make this correction. The library need not be limited to ASCII text but can include special characters and text which is displayed as emojis as well. For example, the emoji text ":sun_with_face:" (which displays as a smiling sun) can be translated to "Morning Playlist".

In a particular configuration, the vocabulary is defined hierarchically, such as on a company and user basis where a company vocabulary group details company jargon and a user vocabulary group details a user's own specific jargon, typos, etc. The user vocabulary group could be applied first substituting user jargon or a replacement (which might be the standard term or company jargon). The company vocabulary group could then be applied to the output from the user process. Greater numbers of hierarchical levels can be defined.

Returning to FIGS. 3A and 3B, after any vocabulary lists or other text manipulations which may be appropriate are applied (step 312) to produce a text query, the method operates on the text query to identify which predefined question (if any) most closely matches the text query. The question identification process uses a combination of two alternative matching methodologies, a string matching process and an API matching process. This combination allows for an efficient and robust matching and makes use of question and API parameters that can be easily adjusted to increase accuracy. While the string and API matching processes could be done linearly (e.g., consecutively), the various matching tests can also be executed in separate threads that run concurrently, and this arrangement is illustrated, in part, in the figures.

The matching process is performed against a finite number of predefined questions and predefined API data associated with those questions. A master set of predefined questions can be defined, e.g., for a company or industry, and various collections and other subsets defined within it based on a permissioning process. The system can be configured to utilize a predetermined set of APIs in order to answer questions which are associated with APIs. Ultimately, a given user will have a limited set of predefined questions that they are permitted to receive answers to. Different users may therefore be permissioned to ask questions grouped in different sets (e.g., collections) of predefined questions. As a result, it is possible for the process to match the same input from two different users to two different predefined questions.

Each company may subscribe to use the system and method of the present invention to ask a subset (or the entire set) of questions which the system is configured to answer. The one or more questions which a company is permissioned to ask may also be referred to as a collection.

Different companies may subscribe to different subsets of questions which the system is configured to answer. The system of the present invention allows different subscribing companies to permission one another to use their respective questions.

For example, a first company may subscribe to (and therefore be permissioned to ask) a first subset of questions of the master set. A second company may subscribe to ask a second subset of questions of the master set. The first and second subsets may be mutually exclusive. The first company may permission the second company to ask the questions included in the first subset, and the second company may permission the first company to ask the questions included in the second subset.

The questions which a user of either the first or second companies is ultimately permissioned to ask depends on the hierarchical permissioning defined within his/her company. The description with reference to FIGS. 3A-3B, 17 and 18 is performed only for the questions which the user is permissioned to ask.

To improve operating efficiency, user-specific records can be generated, such as at user-logon, that have data identifying the permissible questions for that user. The user-specific records (which can be temporarily maintained in system memory for the user's logon session) can be generated using User Question Set Generator 245 and can be used when processing questions input from that user. This arrangement provides increased operating efficiency and faster response time for a given user, particularly where there is a large number of questions defined relative the number the given user is allowed to ask.

Returning to the flow charts, in the string matching thread, the process will compare the input query text against a predefined question text (in the set of permitted questions) and generate a string matching score. (Step 314) Various string matching algorithms known to those of skill in the art can be used. In one embodiment, a Jaro-Winkler distance is determined, normalized to provide a score between zero and one, with one being an exact match. Input queries that are longer or shorter than the defined question text score less than one even if the input query includes the exact question text within it. If a comparison results in an exact match (step 316) the respective question is selected as the matching question (step 318). If there is no exact match, the scores are checked to determine if any match exceeds a predefined first string match threshold, such as, for example, 95% (Step 320), and if so, to select as the matching question the one with the largest score exceeding the threshold (step 322).

If a matching question has been found in the text matching process, an ID of the matched question is output from the matching process (step 326). Otherwise, the process continues along with API matching to identify a matching question. If string matching and API matching are running in separate concurrently executing threads, the API matching threads can be terminated if there is a successful string match. (Step 324). The API matching process is likely to be a more resource-demanding process than the string matching process and so string matching is expected to finish first. If the matching processes are run concurrently, API matching can be initiated after string matching is complete and when no match is found (step 320).

Each predefined question may have one or more associated API definition(s) that contain(s) information needed to access a data source to retrieve information needed to answer the question when the question is associated with an API. (An API can be associated with more than one question.) When a particular question is associated with an API, the API definition includes details about how to access the (typically remote) data source and the message format when doing so, including required and optional data field parameters (tokens) for a data retrieval request or other action. For example, an API to access stock exchange data could identify a URL to send the query, identify a required input token to specify a given security (e.g., "IBM") and an optional input token for a date. The definition can also define a closed set of valid input tokens. In the stock exchange example, the set of valid tokens for the security would be the set of securities listed on that exchange. Other input tokens could also be required, such as a user name and password for access to the service.

During the API string matching, an API match score is determined for each question in the set of permitted questions with reference to the linked API(s) for that question. (Step 330). The match score is a function of the text query and various attributes of the respective APIs. In an embodiment, the match score is a function of a number of correct and unused tokens in the text query. The match score can be further based on additional information, including default values specified for input tokens of a given API and text keywords (labels) included as part of API definitions, unused tokens in the text query, and other factors. Some of the tokens in an API may be fields such as dates, numbers, prices, or other values, referred to herein as non-entity tokens. The input query text can be preprocessed to identify words or phrases representing dates, prices, numbers or similar fields (Step 328).

By way of example, a text query could be "what is the volume of gold today". For an API used to access a precious metal exchange service, the word "gold" could match a permissible value of a "metal-type" input token of that API, the word "today" could match a non-entity date token of that API, and the word "volume" could match a label associated with the API. In scoring other APIs, the word "today" might match non-entity date tokens of those other APIs but none might have both "gold" as a valid input token and "volume" as a label and so these would be ranked lower. (A particular API scoring process is discussed separately herein.)

After each of the questions are scored based on the APIs, the scores are checked to see if a single highest scoring question can be selected. (steps 332, 334). If there is no clear winner, a list of possible questions based on the top scores can be output and the user asked to select which question they want. (Step 336, 338). Prior to presenting a list of possible questions, the system could first check to see of any of those questions has a string matching score greater than a second string matching threshold that is lower than the first string matching threshold, for example, 75%. If any such exist, the one with the highest string match score can be selected. If there are none, then the user can be given a list of questions to choose from. There can also be a minimum threshold defined, so that only questions with string match scores that exceed a third threshold which is less than the second string matching threshold, are presented as options. Other minimum scoring thresholds can also be defined. If no questions are available for a pick list an output to the user can be presented indicating that there is no valid match. (Not shown).

Once a matching question has been identified (through string matching or API matching), the process can move forward. In step 340 an answer string template can be retrieved which details the data that needs to be obtained to answer the question. The data can be obtained via the data source accessed using the API associated with the matched question. The template can also include additional information such as details of how the answer should be formatted when returned to the user.

If, after applying the tokens in the text query to the API token fields and any default token values for API tokens not specified in the text query there are still missing required tokens for the API, the user is asked to provide that information. (Steps 342, 344, and 346). Various ways to request this information can be used. A particular predictive input process and user input screen that can be used is discussed separately herein. Certain questions or APIs may require special security before being addressed. For example, a question that would retrieve sensitive employee data or request to initiate a large purchase of securities may require entry of an access code. If security is required, the user is prompted to enter appropriate security codes and, if valid, the process proceeds (steps 348, 350, 352). Otherwise, the user can be informed that they are not authorized and the process terminates (steps 354, 355). Various types of conventional security measures can be used, such as simple PIN numbers, a challenge and answer from security questions, biometric data, etc.

The process processes by formatting a request using the API definition and the value of the various input tokens and then issues the API call to the data service. (Steps 356, 357). Responsive data is received and subsequently processed to extract the values of the output tokens in the response of interest. (Steps 358, 360). The data is inserted in a response, formatted as appropriate (such as a sentence, spreadsheet, graph, CSV file, pivot grid, heat map, etc.) and then returned as output to the user. (Steps 362, 364). If the user has designated a language different from that in the returned answer, the answer can be processed by a translation service (step 366, 368) before being returned to the user. The process then completes.

FIGS. 4A-4D set forth an embodiment of a particular database architecture 400 for use in defining and storing data related to defined questions, defined APIs, defined vocabularies, and various permission related information. The various data objects are addressed below. The data objects can be stored in the database in a variety of different ways as will be known to those of skill in the art. In one configuration, each type of data object is associated with a table and each instance of that object corresponds to a row in the table and each defined object field corresponds to a column in the table. Various data fields for each record are addressed. Additional fields can be included and not all fields may need to be implemented in a given embodiment.

QATABLES 402 is used in the definition of the master question list. Each QATABLES record has its own unique ID and corresponds to a predefined question. The AnswerStringID field provides a link to an ANSWERSTRING object 404, e.g., via that object's its unique ID. A Company ID field can be defined to associate the question with a company that 'owns' the question. A Collection ID field can be used to group questions so they can be assigned to different entities, such as companies or users. Additional information can also be stored, including whether or not the question requires a separate security check. Certain questions may be compound in that the input tokens used in the context of answering that question should be taken from the input tokens or answer of a previously processed question. If this feature is supported, a field specifying this attribute can also be included. An additional field, such as in json format, can be provided summarizing various aspects of the defined question for ease of reference. This data can be generated by reference to other fields in this and other table records. Further details about when the question was defined or edited and by whom, how frequently the question has been asked (e.g., by all users or all users of that collection) and other meta-data can be included as well. FIG. 5 is an example of a representative row in a QATABLES row.

QALIASES 408 is used to store the primary text of a given question (e.g., the actual question itself in its basic or most typical form) and can also be used to store alternative phrases (e.g., aliases) that can also be used to match that particular question. Each record has a unique ID, a QATABLES_ID linking to a particular record in QATABLES 402, the primary question text and one or more optional question aliases. An additional field can be provided to specify which record is the primary question record. As apparent, there can be many question alias entries for each question. For example, a primary question text can be defined as "what is the weather today". Aliases can be defined to allow the question to be asked in the alternative forms "what is today's weather," "how is the weather today," "what's today's weather like," etc. Each of these alternative forms relates to the same base question. Further fields can be used to specify company and group IDs for each record. This permits, for example, different aliases for the same question to be defined by different companies. FIG. 6 is an example of representative rows in a QALIASES table 408 for the question defined in FIG. 5.

The APIS records 412 are used to define the Master API list. Each record has a unique ID, an API name, a designation such as a URL specifying where the service for that API can be accessed, and details specifying the input format and output formats of communications with the service through that API. Various other fields can be provided as well, such as the frequency or number of times the API has been utilized by users. The records can also be linked to and from other APIs to allow for chained APIs, such as where the inputs for one API call require outputs from another API call. As with other entries, a company ID field can specify the owner of the API record. APIs, as well as questions, can be part of collections which are 'owned' by a specified entity, such as a company, and that entity may be allowed to grant permission to another entity to access the collection (read only or read/write) FIG. 7 is an example of a representative row in an APIS table 412 for the question defined in FIG. 5.

ANSWERSTRINGS table 404 are used to store the shell of an answer for an associated question. Each record has its own unique ID. FIG. 8 is an example of a representative row in an ANSWERSTRING 404 table with the ID linked to in the question defined in FIG. 5.

The APIANSWER table 406 is used to store a relationship between an ANSWERSTRING record and the API associated with such a record. An APIANSWER record can include a unique ID and the IDs of the ANSWERSTRING and API records. FIG. 9 is an example of a representative row in an ANSWERSTRING table 404 linking the APIS record of FIG. 7 with the ANSWERSTRING record of FIG. 8.

The INPUTTOKENS table 414 is used to store information for the input tokens related to a given API. Each record has its own ID and a linking field that specifies a particular API record in the APIS table. For the linked API, records in this table define the input tokens, e.g., by name and type, as well as other attributes such as length, and whether or not the token is optional.

A TOKENRECORDS table 418 can be used to provide a conversion between an English (or other) language version of a token value into the format that token value must have when being passed via the API. For example, a data service may require countries to be identified by abbreviations. One TOKENRECORDS entry for that API service would then specify that an input "UNITED STATES" for a country token be passed as the value "US". A different API may require this value to be passed as "USA". This conversion frees the user from having to learn different formats for different data sources. Other conversions can include ensuring text is capitalized, converting text to reference codes, etc. The TOKENRECORDS 418 records each have a unique ID, a mapping from a token name to a token symbol, and a Token_CSV_ID that is used to specify (directly or indirectly) which input token the record is associated with.

FIGS. 10A and 10B are examples of representative rows in an INPUTTOKENS table 414 listing various input tokens for the API defined in the APIS record of FIG. 7. FIG. 11 is an example of representative rows in a TOKENRECORDS table 418 for the 'country' API input token. There are various ways in which the TOKENRECORDS 418 records can be linked to an INPUTOKENS 414 record. In the present embodiment, they are linked using an intermediate TOKENS table 416. Each record in the TOKENS table 416 has its own ID and value indicating a particular Token_CSV_ID. A CSV_ID field value in an INPUTTOKENS record identifies a record in the TOKENS table and that record then specifies the Token_CSV_ID value to identify the set of records in the TOKENSRECORD table 414 relevant for the token. FIG. 12 is an example of representative rows in a TOKENS table 416 linking tokens defined in FIGS. 10A and 10B with token value/symbol records of FIG. 11.

As explained elsewhere herein, one or more classification labels can be defined for APIs separate from the various input tokens and this information used during the API matching process. The CLASSIFIERS table 410 contains records defining these labels. Each record in the table has a unique ID and identifies the question by reference to a record in the QATABLES table 402 and the label text. FIG. 13 is an example of representative rows in a CLASSIFIERS table 410 defining several labels for the question defined in FIG. 5. Alternatively, instead of linking these labels to a question, and therefore indirectly to the API for that question, the records could instead link to the API. By linking to the question, the same API could be used as a source of data for different questions and different labels specified for each question.

In this embodiment, certain API input tokens can have a predefined closed set of potential values. Questions/APIs can be defined to require that entered token data be within this closed set or to allow token data to be entered that is not in the closed set (but where, for example, that out-of-set value might be valued differently than an in-set value when during API scoring). This data can be provided using the ENTITYVALUES table 422. The ENTITYVALUES table 422 lists the permissible values for a given token grouped together by a defined Entity_Group_ID. The Token record in the INPUTTOKENS table 414 has a field specify the Entity_Group_ID for the set of permissible values of that token. FIG. 14 is an example of representative rows in an ENTITYVALUES table 422 with permissible values for the country token defined in the INPUTTOKENS table of FIGS. 10A and 10B.

An ENTITYGROUPS table 420 can alternatively be used to create a link between an input token and entity values. This intermediate linking allows entity values to be more easily assigned to different companies and more easily enabled and disabled. FIG. 15 is an example of representative rows in an ENTITYGROUPS table 420. Each record has a unique ID and this can be used as the Entity_Group_ID value specified in the ENTITYVALUES table 422 and the INPUTTOKENS table 414. FIG. 15 is an example of representative rows in a sample ENTITYGROUPS table 420 defining group IDs referenced in the tables of FIGS. 10A-10B and 14.

Similar to the definition of API input tokens, the OUTPUTTOKENS table 424 is used to store information about the output tokens related to an API. Each record in the OUTPUTTOKENS table 424 has a unique ID and references a particular API ID in the APIS table 412. Output token fields can also include the output token name and type. Other fields can include a mapping to the location of that output token value in the response from the API call, a length, description, and other data. FIG. 16 is an example of representative rows in an OUTPUTTOKENS table 424 for the API defined in FIG. 7.

Various data tables can be used to store vocabulary in a hierarchical manner. For example, a VOCABPHRASES table 430 can be used to store jargon and other vocabulary specific to a given company in a before (company jargon) to after (standard term) format. Each record in the table can also specify a particular Vocab_Phrase_Group_ID to which it is a member. This can be useful for assigning groups of vocabulary to a designated company. A VOCABPHRASE-GROUPS table 432 can be used to make such assignments, where records in the table link a company ID to a respective Vocab_Phrase_Group_ID. Similarly, VOCABUSERS tables 434 can be used to store vocabulary defined for a specific user with records indicating vocabulary words before and after and the User_ID for that vocabulary.

Additional data tables can be provided to define specific companies, giving each company a unique company ID (COMPANYNAMES table 440). Likewise, records are provided to define each user, linking them to a given company and also identifying other features such as the type of user (e.g., regular user, administrator, etc.), and details about the devices the user is allowed to use to access the system. USERS table 442 is an example. Like companies, users can also be linked to specific collections or subsets of collections, and preferably only to those for which the company they are under already has access.

The various questions, APIs, and other information can be organized into collections. Each collection can be associated with one or more companies that are allowed to access that collection. Examples of tables for organizing this data are the COLLECTIONS table 446 and the COMPANYCOLLECTIONS table 448. Finally, a PERMISSIONS table 444 can be used to separately specify which company collections an individual user has access to.

The various linking and other tables shown in the embodiment of FIGS. 4A-4D provide flexibility and allow system operators to quickly and easily assign questions, APIs, and other elements to collections, and to grant access to various collections on a company and user basis. This configuration also makes it easy for a first company to share its own collections of questions, APIs, and vocabulary, etc., with other companies by simply sharing access to the relevant collections. While the various database entities shown in FIGS. 4A-4D have been discussed as being represented as tables, other storage formats known to those of ordinary skill in the art can be used as well. Certain data objects, such as lists of permissible values for input tokens or lists specifying the specific form a given input token value must have when submitted to an API (see, e.g., TOKENRECORDS 418 and ENTITYVALUES 422) can be represented as simply CSV data files that exist outside of a dedicated database system. For purposes of the present inventions, such files are considered as being part of the general database system.

Figure 17:
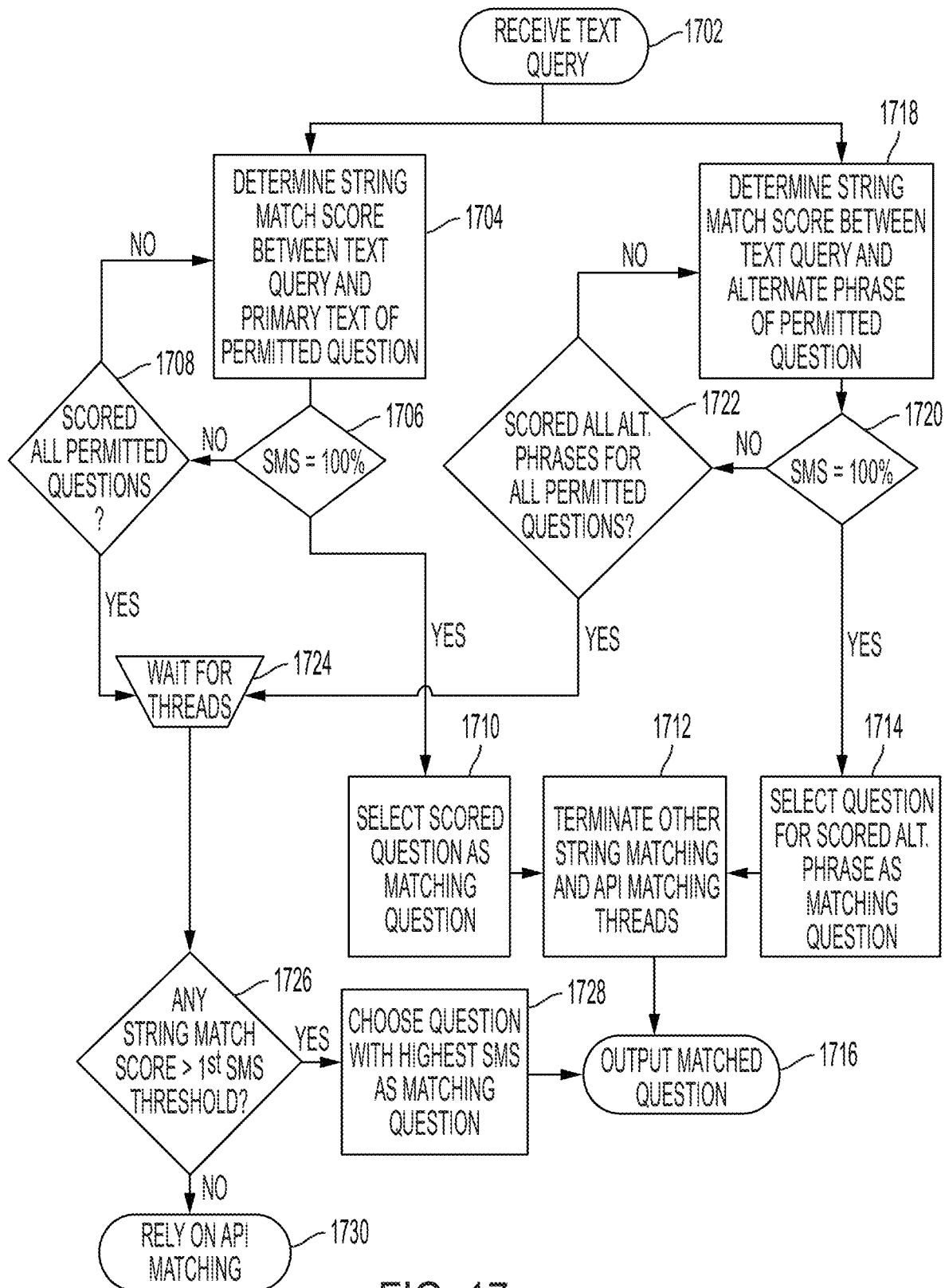
FIG. 17 is a flowchart detailing a string matching process according to an embodiment.

Turning to FIG. 17, there is shown a more detailed flowchart of an embodiment of the string matching process of steps 314-324 of FIGS. 3A-3B. In this configuration, the string matching is executed in a multi-threaded environment. One thread performs string matching against the primary text of permitted questions, such as the text defined in the QALIASES table 408 for permitted questions and where the primary flag is set. (Steps 1704, 1706, 1708). The second thread performs string matching against alternative alias phrases for the permitted questions, such as the text defined in the QALIASES table 408 for permitted questions and where the primary flag is not set. (Steps 1718, 1720, 1722). By way of example, treating the question defined in FIG. 5 (a search for wine ratings) as a permitted question, this question has an ID of 811. Referencing the QALIASES table 408 of FIG. 6 shows that records linked to this ID define the primary question text as "Wine Search" and aliases for this question of "wine", "search wine", and "search wines." The text query would be scored against these values.

If a 100% match is detected in either thread, that question is selected as the matching question, the other string matching thread(s) and any API matching threads are terminated, and the selected question is output. (Steps 1710, 1712, 1714, 1716). The ID of the matched question is then output as appropriate. (Step 1716) If a thread completes its check without a 100% match, the system will wait until each thread is completed (step 1724). The string matching scores will then be evaluated to identify if any exceed a first minimum string match threshold, such as, for example, 95% (step 1726). If so, the question with the highest string matching score is selected as the matching question and output. (Steps 1728, 1716). If no matching question is found during the string matching process, the matching process relies on to the API matching results. As noted below, the string matching scores can be used as a fallback if no question is selected in the API matching process.

Figure 18:
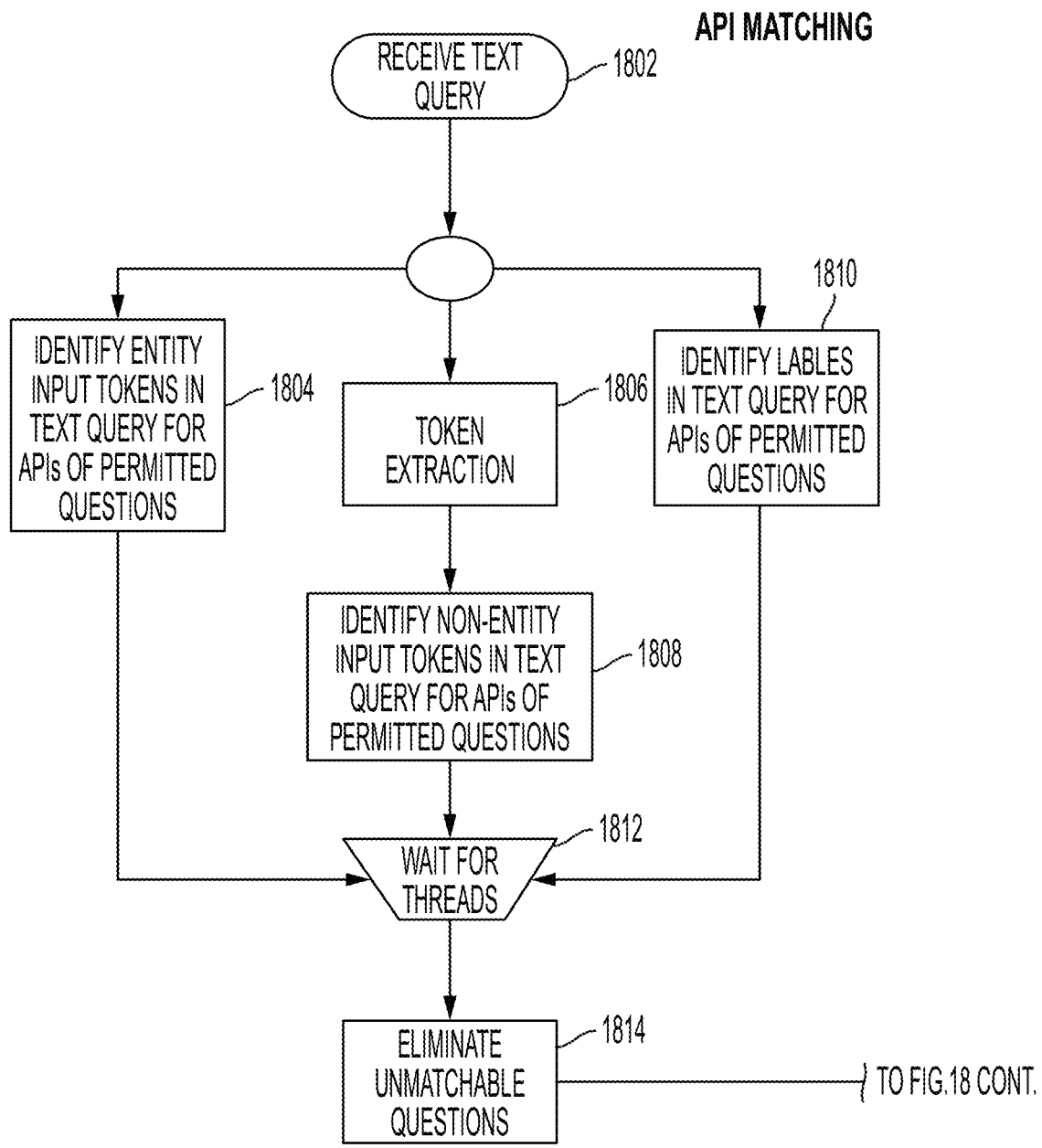
FIG. 18 is a flowchart detailing an API matching process according to an embodiment.
Figure 18:
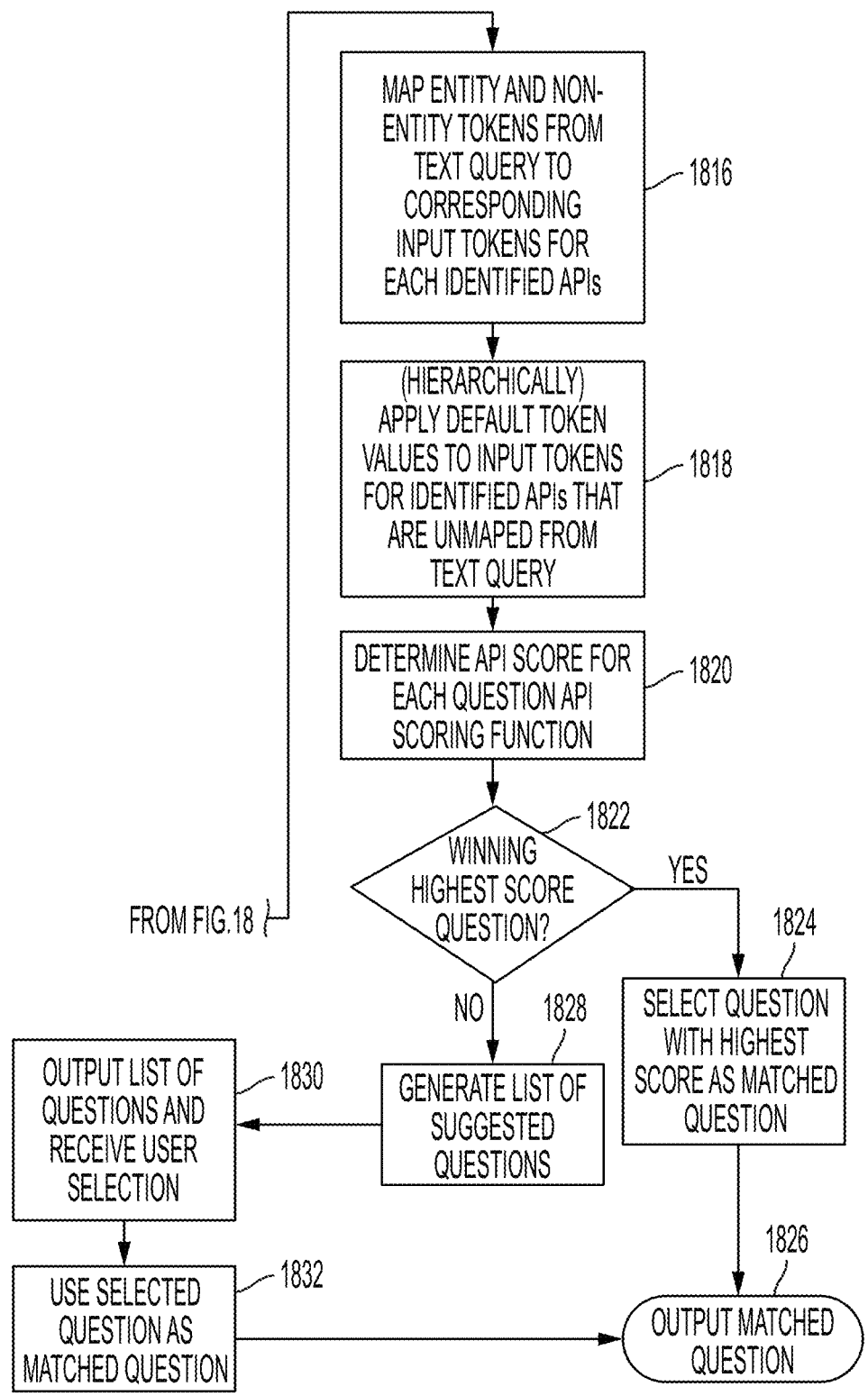

FIG. 18 is a more detailed flowchart of an embodiment of the API matching process of steps 328-338 of FIGS. 3A-3B. In this configuration, the API matching is executed in a multi-threaded environment and can also run concurrently with the string matching process. Because the API matching process is more computationally intensive, it is expected that the string matching threads will complete first. However, additional logic can be added to address situations where this does not occur to give priority to the string matching results.

Once the text query is available to the system (Step 1802) the API matching thread(s) can be initiated. In an initial phase, the process determines parameters used for API scoring of the questions. Various parameters can be used. In an embodiment, the scoring parameters can include, but need not be limited to, one or more of: (1) content in the text query that matches permissible input token values for APIs, (2) content in the text query that matches non-entity token field types for APIs, such as numbers, currency values, and dates, (3) content in the text query that matches labels that are defined for the APIs, and (4) content in the text query that matches alias values for the question. The APIs checked are those which are associated with the permissible set of questions. With reference to the database architecture of FIGS. 4A-4D, the APIs are those specified in records of the APIANSWER table 406 that that have an Answer_String_ID with a value that matches the Answer_String_ID value in any record in the QATABLES table 402 for a permitted question. By way of example, treating the wine search question defined in FIG. 5 (question ID 811) as a permitted question, the value of the Answer_String_ID field or this record is 1561. The APIANSWER table of FIG. 9 indicates that the data source accessed by API 192 is needed to provide data for answer ID 1561. As will be appreciated, if an API is associated with more than one question, it is possible that the API score for those questions will be different.

Returning to the flowchart, in the illustrated embodiment, separate threads can be used for the evaluation of the parameter values for each of the APIs for the permitted questions. Of course, the functionality can be implemented in different ways, such as in a sequential process or with more or fewer parallel threads as may be appropriate and efficient.

In step 1804, the text query content is evaluated with respect to each input token for each API at issue to identify where a word or phrase in the text query matches a permitted value of the input token. In the example, the INPUTTOKENS table 414 of FIGS. 10A and 10B specifies several input tokens for API ID 192, one of which is a "country" token. This token has an Entity_Group_ID of 46. See FIG. 14. The ENTITYVALUES table 422 of FIG. 14 specifies valid input values for Entity_Group_ID 46, and thus indicates the permissible values for the "country" token input of that API. Any input query with text that matched one of these listed countries would be considered a 'match' to the country token for the wine search API. The permissible values for the input token also includes the formatted text that would actually be passed to the API as defined in the TOKENRECORDS 418 entry. Accordingly, in addition to the values specified in the ENTITY VALUES table 422, the text query content can also be compared to the converted form of those values as defined in the TOKENRECORDS table 418 for that token input of that API. So, an API token that should receive the name of a country could be matched by "united states" if that phrase is in the ENTITYVALUES table 422 and by "US" if the TOKENSRECORDS 418 entry for that token input of that API specifies that the country code to use for "united states" in this API parameter is "US".

Of course, there are likely to be many APIs at issue for the permitted questions, and so the same text could also match a token input for any other APIs if the value is permitted for that other API. The process will keep track, for each API of the permitted questions, whether a match for a given input token has been found. The process can also record which word or phrase in the text query has matched at least one token.

In steps 1806 and 1808, the text query content is evaluated to identify where a word or phrase in the text query can be used as input for a non-entity token for each of the API for the permitted questions. In step 1806, the text query is processed to identify words or phrases that can be valid non-entity input values. These types of values include dates, currencies (prices), and numbers. Other data types may also be included as appropriate. After determining whether the text query contains, e.g., any dates, currency amounts, or numbers, the process continues in step 1808 to identify, for each API of a permitted question, whether there is a non-entity input token that can be filled with text query content. This process is similar to that discussed above with respect to step 1804 and entity token processing.

Referring to the INPUTTOKENS table 414 of FIGS. 10A and 10B, the example API ID 192 has two numeric input tokens (a minimum and a maximum rating value). In a simple implementation, if there is a numeric value specified in the text query, it can be considered a potential input to each of the input tokens without consideration of the actual number specified. In a more precise implementation, valid data ranges for the numeric inputs can be defined in a manner similar to how valid input values for entity tokens are defined. The value of the number in the text query would be checked against the permissible range and a match recorded if the number was within that range. The process can also record when a non-entity value in the text query has matched as a possible input to at least one non-entity token.

In step 1810, the text query content is evaluated against any labels that are defined for any of the APIs of permitted Questions to identify any matches. Referring to the CLASSIFIERS table 410 of FIG. 13, four labels have been defined for question 811, which has an answer that is provided by the source accessed through API of ID 192.

Various techniques known to those of skill in the art can be used to perform the evaluations above and to record the results for subsequent use.

In an embodiment, the NLP Training Sentences module 290 can be utilized to identify input values for tokens. The NLP Training Sentences module can be configured to identify input values for tokens, for example, by utilizing predefined PRECURSOR(S) and/or PRETEXT(S). A PRECURSOR can be configured to determine that when a predefined PRECURSOR word/text is detected by the NLP Training Sentences module 290 in the text query, the text that follows the PRECURSOR in the text query (e.g., a single word, number, date, price, entity, etc.) represents a specific input token value such as an entity value, a date, a price, a number, etc.

A PRETEXT can be configured to determine that when a predefined PRETEXT word/text is detected by the NLP Training Sentences module 290 in the text query, the remainder of the text in the text query which follows the PRETEXT is an input token value, for example, an entity value, a date, a price, a number, etc., or a combination thereof, for a particular token associated with that PRETEXT.

Figure 23:
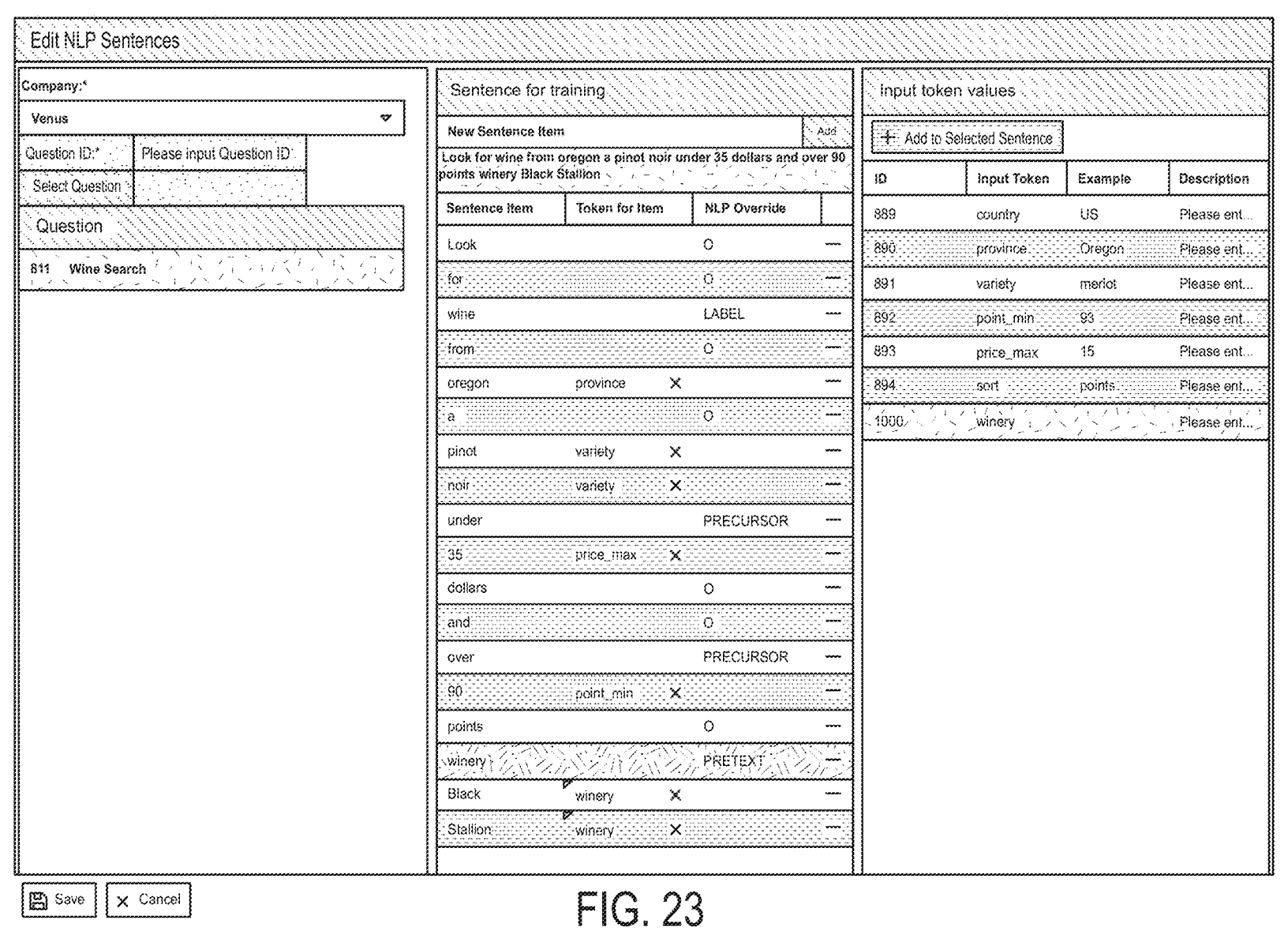

FIG. 23 illustrates an exemplary NLP Training Sentences module 290 screen. The NLP Training Sentences screen of FIG. 23 may be described with reference to the wine search question defined in FIG. 5 (question ID 811). The exemplary NLP Training Sentence in FIG. 23 is "Look for wine from oregon a pinot noir under 35 dollars and over 90 points winery Black Stallion".

Referring to FIG. 23, the word "under" in the NLP Training Sentence may be a PRECURSOR that is associated with the input token value "price_max" (e.g., input token ID 893, see FIG. 23). The value of the input token "price_max" identifies the maximum price set for the wine. Thus, as an example, when the text query is "wine under $35.75", the NLP Training Sentences module 290 determines that the text "under" in the text query is a PRECURSOR, and therefore, the following text "$35.75" is a price/number which represents the value for the input token "price_max" because the text "$33.75" follows the PRECURSOR "under". In other words, for the exemplary text query given above, the value of the "price_max" input token would be set to $35.75.

In addition, the PRETEXT "winery", as shown in FIG. 23, may be associated with the input token "winery" (e.g., input token ID 1000, see FIG. 23). Merely as an example, if the text query is "winery Black Stallion", the words "Black Stallion" would be the value given to the input token "winery" because "Black Stallion" is what follows the PRETEXT "winery" in the text query.

Once the API scoring parameters for each of the APIs of a permitted question has been determined (step 1812), the API matching process continues. A first pass is made to identify permitted questions having APIs for which there was a match to at least one of the entity tokens (actual or alias tokens as defined in, e.g., the ENTITYTABLES, e.g., the ENTITYGROUPS table 420 and/or the ENTITYVALUES table 422), or non-entity tokens (such as numbers, currency, and dates) and any labels. Collectively entity and non-entity tokens are referred to herein as "General Tokens". Any question without at least one API general token match is considered unmatchable and removed from consideration. (Step 1814).

For the remaining questions, a score is generated based on the scoring parameters and, optionally, with reference to additional data. In a particular embodiment, for each of the permitted question APIs, the process determines a Matched Amount indicating how many required and optional input tokens (including non-entity tokens) were matched by the text query. Unmatched optional input tokens can be ignored at this point. A Missing Amount indicating the number of required tokens that were not matched is determined. Unmatched optional tokens are not considered in the Missing Amount total. Likewise, unmatched tokens for which a default value is defined are also not considered to be missing. The actual defined default values for the various APIs can be determined at this point (step 1818) or the system can simply note that defaults are available and retrieve the actual default value at a later time. The default token values for each API can be set at the company level, the user level, the question level, and the API level. In other words, a particular API can have a first default token value defined for each company that is permissioned to access that API, a second default token value defined for each user of each company that is permissioned to access that API, a third default token value for each question that may be associated with that API, and/or a fourth default token value for the API itself. The first to fourth default token values may be different from one another, or equal to one another.

A Label Amount for the APIs is determined that indicates whether there was a match to any of the labels defined for the API. The Label Amount can also reflect whether no labels were defined (and so there could not be a match). Each label can also have a particular weight that can be considered if it is matched and the weighting of matched labels reflected in a Label Weight value. For example, if multiple labels for an API are matched, the Label Weight can be the largest weight of the matched labels or a combination of the weights for matched labels. The specific definition of the Label Amount and Label Weight can be selected to reflect how important a label match considered to be in selecting an API that matches the input text.

In this particular embodiment, a Label Amount of one indicates that one or more labels for the API were matched, a Label Amount of zero indicates that there were no labels defined for the API (and so none could be matched) and a label amount of negative one indicates that labels were defined for the API but none were matched. The Label Weight is the character length of the label and, where multiple labels are matched, the length of the longest matched label. If no label match is found, the weight can be defined to be zero.

An Unused General Token value can also be determined. This reflects the number of potential general tokens in the input text for which there was a match in at least one other API but not the API at issue.

It will be appreciated that at least some of scoring values can be generated on-the-fly as each API is evaluated in turn while others, such as the Unused Token value may need to be generated later.

These, and possibly other, scoring parameters are then combined using a predefined scoring function to generate an overall API score for each of the questions. (Step 1820) In a particular configuration, the scoring parameters are combined in a weighted manner and the overall API score for a question is calculated to be N1 times the Matched Amount (or N1a times the Matched Amount for entity tokens and N1b times the Matched Amount for non-entity tokens) plus N2 times the Label Amount plus N3 times the Label Weight, where N1, N1a, N2a, N2 and N3 are predefined weighting parameters.

The question with the highest overall API score can be selected. If there is a clear winner, i.e., one API score is the highest and there are no ties (Step 1822), the question with the highest API score is selected as the matched question (step 1824) and the Matched Question ID is output (step 1826). If there is a tie for the highest overall score, the user can be prompted with a list of questions associated with the top scoring questions (steps 1828, 1830) and the question selected by the user then output as the matched question (steps 1832, 1826). Alternatively, the system can first reconsider the string matching scores and determine if any exceed a second threshold that is less than the first threshold. If any such questions exist, the one with the highest string matching score can be selected. If no question can be selected automatically, the user can then be asked to choose. A minimum score can also be defined and if there are no questions with a score that exceeds a predefined minimum the process can indicate that there is no match found.

A variety of additional scoring factors can be considered to reduce the likelihood of a tie. The API scores can include a factor reflecting the Unused Token value, where questions that have APIs with lower Unused Token values are ranked higher. Historical data related to prior questions asked can applied to identify which of several questions is the one most likely to have been asked. Historical data factors can include (i) the frequency that various questions have been asked by the user and or by larger groups, and (ii) the time and/or day various questions are asked by the user and or by larger groups. These factors can be weighted according to predefined weighting parameters and included in the overall API score or applied as needed as a tie breaker.

Once a selected question is identified, and as discussed with respect to FIGS. 3A and 3B, the process prepares an appropriate message to submit to the data source of the API for the selected question. The required and optional tokens needed for the call can be obtained from the INPUT-TOKENS table 414, such as shown in the example of FIGS. 10A and 10B. After the token values derived from the query text and default values for any missing tokens are applied there can still be values that remain unassigned and must be separately provided by the user.

Figure 19A:
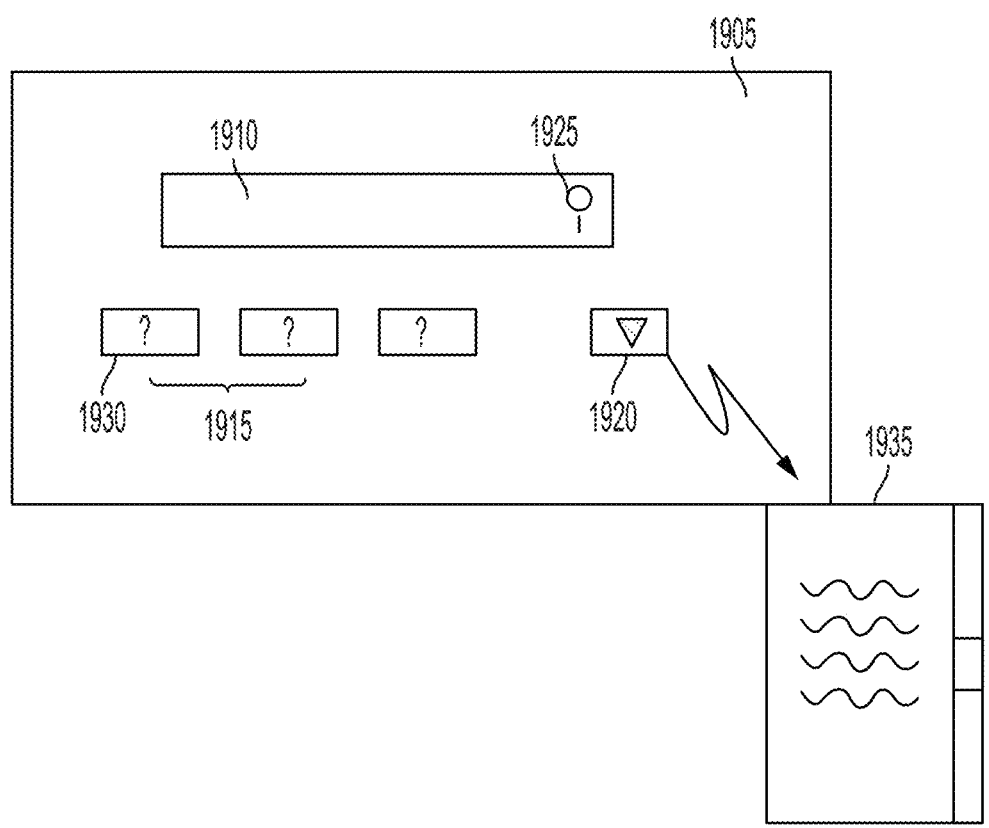

FIG. 19A is an illustration of a predictive data input screen a token input area 1905 for receiving user input for a particular token. The token input area 1905 includes a data input field 1910, a first user input interface 1915 displaying for selection a first set of input options, a second user input interface 1920 allowing display for selection a second set of input options, and a third user input interface 1925 allowing display for selection a third set of input options. In a particular embodiment, the first user input interface 1915 comprises one or more buttons 1930 each with a specific data value displayed over or next to it. The user can choose the value by selecting the respective button. The second user input interface 1920 comprises a pull down selector which, when selected, will present a window 1935 with one or more data values in it that can be selected by the user. The data values shown in the window preferably exclude the data values presented in the first user input interface 1915. The third user input interface 1925 is a search option which permits the user to access all permitted inputs for that token. The search can be based on text entered by the user in the token input area 1905 or in a separate input window accessed, e.g., by selecting a search icon.

According to an embodiment, the first set of user input options shown with the buttons 130 list the n top data values most frequently entered according to some historic measure, such as the values most frequently entered by the user. The second set of user input options are options that are still considered likely choices based on the historic record but are not included in the first set of user input options. In other words, the second set of user input options includes data values that are likely choices based on the historic record for the user but may not be as frequent and/or as relevant as the user input options presented in the first set of input options. For example, the selection window 1935 can list the n+1 to m top data values (where m is greater than n). The third set of input options can provide access to a set of data input values for selection by the user and which are presented independently of the historic record, such as alphabetically. The third set of input options can list every option available to the user or it may exclude options that are available through one or both of the other user interfaces. The input values presented for possible selection in the first, the first and second, or first, second, and third input option sets (or other combination) can be defined by other token values already entered. For example, if a wine search is filtered by type of container and the user has already selected "box wine", options for an input token that asks for a vineyard selection can limit the options to those that offer box wine (and present those options based on historical selections by the user or others made for box wines).

In addition, different commands to perform tasks may be assigned different default command values based on the text of the command and/or based on the historic data for commands by the user.

When there is more than one missing input token, multiple token input areas 1905 can be presented on the display with each input area 1905 presenting first, second, and third user input interfaces with data options for the respective token. The number n of buttons 1930 displayed can be predefined or determined dynamically, such as a number of buttons that can fit beneath the respective data input field 1910, such as in one or several rows. If the number of available options is few, they may all be displayed in the first input area. In such a case, the second input area does not need to be displayed. The third input area may be provided or omitted. The input display can also include an "Autopopulate" button 1940 (see FIG. 19B) that will instruct the system to fill each token input field with the top value identified. As a user selects a value for one of the missing tokens in a first token input area, the system can update the options presented in other token input areas to reflect that value.

As noted, an Administration Module 285 can be provided to create and modify various data fields. A variety of input schemes can be used for these purposes. Embodiments of several input screens are addressed below.

FIG. 20 illustrates an exemplary question details screen for defining and editing questions and related information.

For each question included in the master list of questions, the question details screen illustrates the text which makes up the question, one or more phrases associated with the question, and one or more labels associated with the question. Referring to FIG. 20, box 2005 illustrates the text which makes up the question. In this figure the text of an exemplary question is "Wine Search." Screen area 2010 lists several aliases that have been defined and which are used in string matching. Screen area 2015 lists several labels that have been defined and which are used in API matching. In the example of FIG. 20 the labels and phrases are similar but there is no requirement of this.

During the string match scoring process, text in the text query is compared with the text of the question and the various aliases. For this reason, the same alias phrase should not be associated with more than one question in a given category or other group of permitted questions since this would result in more than one question that could get a 100% string match. The system can provide a warning notice if this situation occurs during creation or editing of these data fields.

Figure 19B:
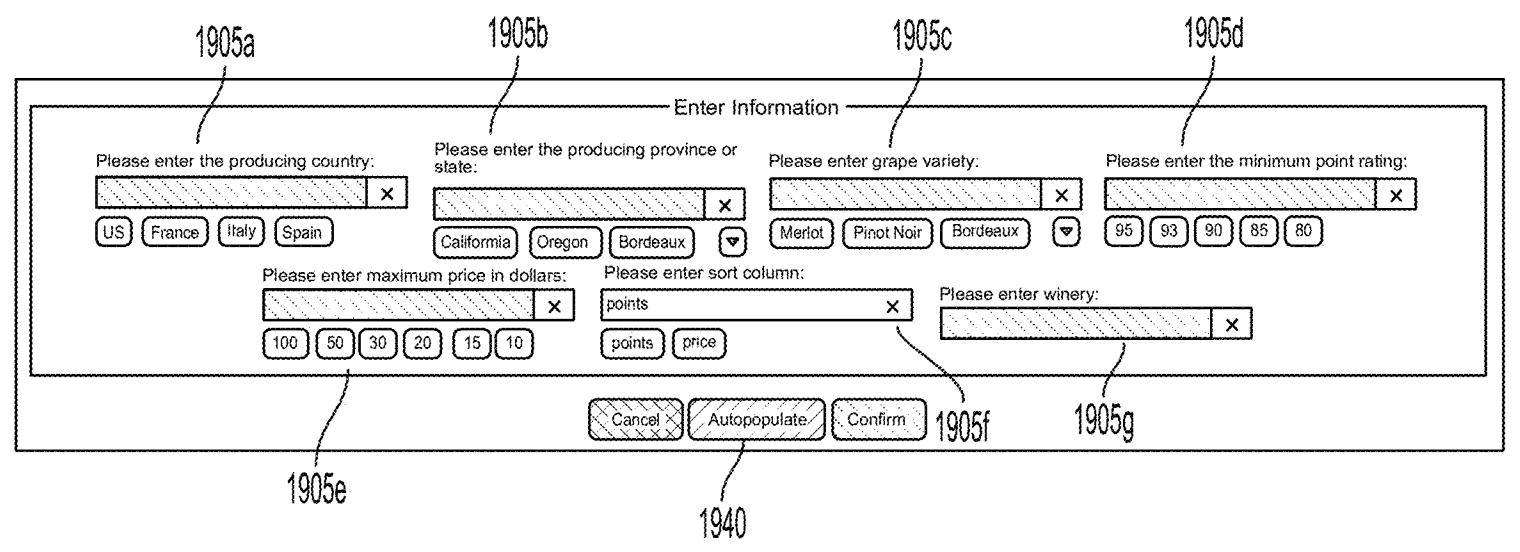

FIG. 20 shows various other screen input areas. Input area 2020 can be used to specify a collection to which the entry belongs. An option box 2025 can be provided to indicate that for this question, the user should be prompted for the Input Tokens associated with the API that will be used with a Question. Prompting can be via predictive input screens as shown in FIGS. 19A and 19B.

Figure 21A:
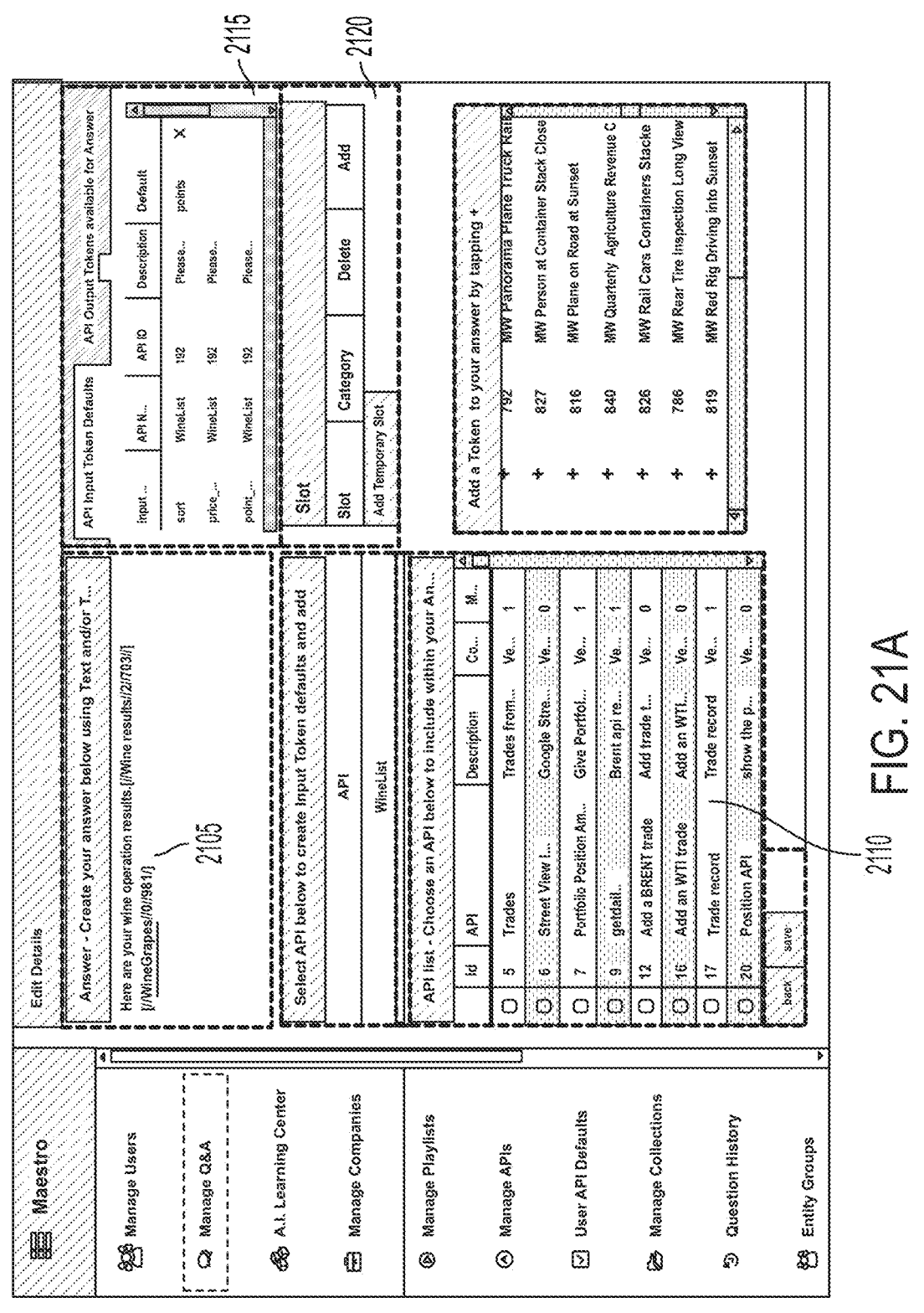

FIG. 21A illustrates an exemplary Answer details screen for defining and editing Answers and related information. Input box 2105 allows a user to input a template for the answer format detailing how the answer to the related question will be presented to the user. The answer can include both text and meta-data referencing output tokens from the question's API or other data. API response values in the designated output tokens will be embedded directly in the text of an Answer. The text included in the answer may be entered in the system language, or alternatively, in the user's native language. The user's native language may be the same as or different from the system language. Examples of supported user languages are, English, Spanish, German, French, Japanese, Mandarin, Korean, etc.

Box 2110 provides a pick-list of APIs that are available to provide data used in answering the question. The list can be limited to only those APIs which are referenced by questions in collections for which the entity (such as a company) has access. FIG. 21B shows an excerpt from box 2110 in magnified format, with the API "WineList" selected to be included with the answer. Box 2115 provides a list showing the various input and output tokens available for the selected API. FIG. 21C shows an excerpt of box 2115 in magnified format. Box 2120 provides an area to specify default values that should be applied to selected input tokens. These are the default values used in the scoring of API(s) as described with reference to step 1820 in FIG. 18.

Figure 22:
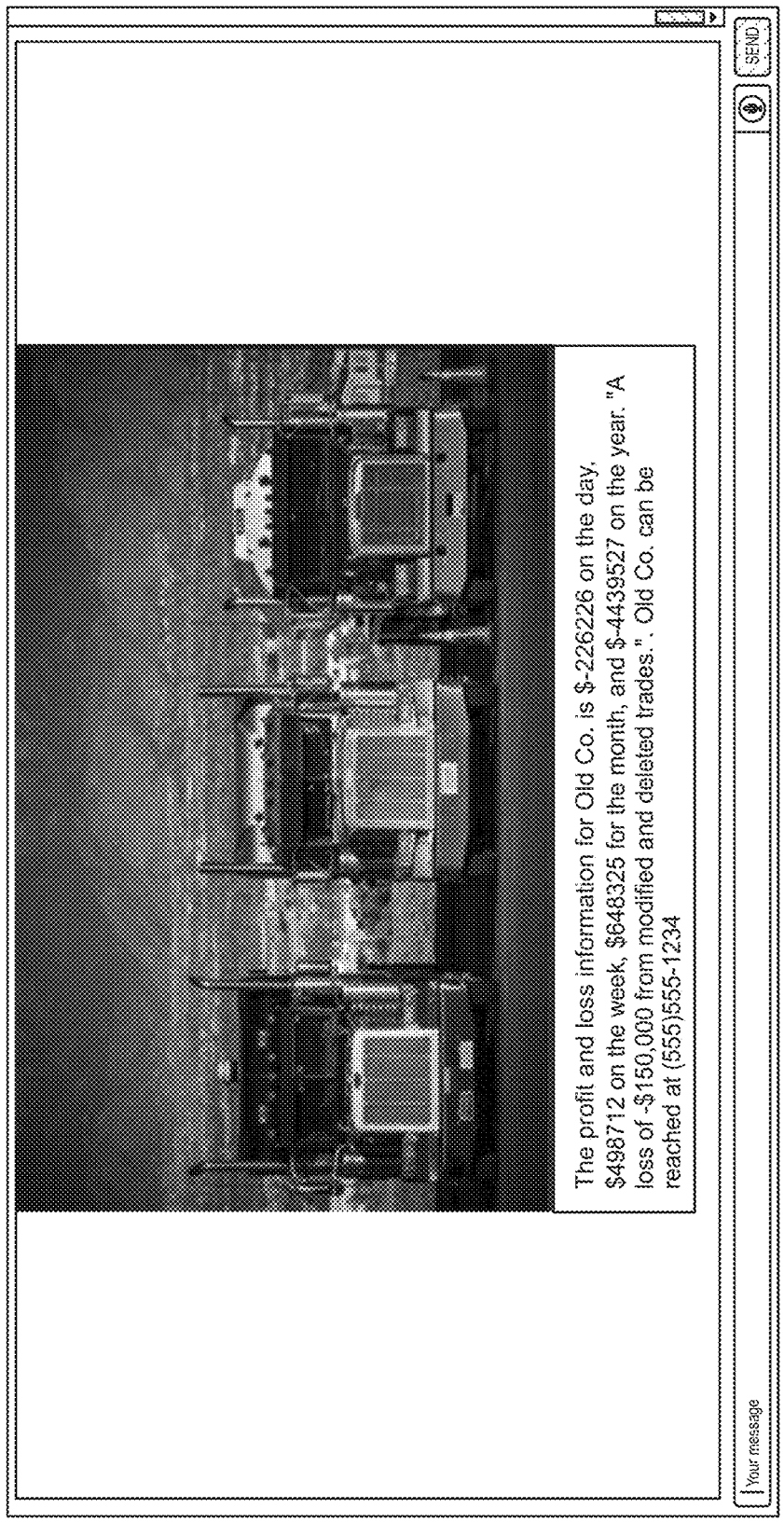
FIG. 22 is a screen display showing a sample output generated by the system in response to a user asking a question.

FIG. 22 is a screen display showing a sample output generated by the system in response to a user asking a question configured to return performance information about a financial trader. The API could have as a required input token the trader's name and as optional tokens date ranges for the data. The template text for the answer has embedded references to values of output tokens that are received when that API queried. One representative Answer format that provides a response as shown in FIG. 22 is the following:

The profit and loss information for [//trader//1//2104//] is $[//day_p1//1//2105//] on the day, $[//week_p1//1//2106//] on the week, $[//month_p1//1//2107//] for the month, and $[//compyr_p1//1//2109//] on the year. [//comments//1//2122//]. [//trader//1//2104//] can be reached at [//phone//1//2123//][//Logo 3 Trucks//0//744//]

Meta-data is set off by special characters "[//" and "//]" (although other special characters or manners of designating meta data can be used), and the meta-data can indicate particular output tokens (by name, position in the data stream returned by the API, or other manner) or other data, such as a logo to be shown as part of the answer. The Answer provided to a user is not limited to plain text and Answers can be defined to return data in other formats, such as a charts, grids, tables, heat maps, tree maps, pivot grids, excel data ranges, screen snapshots, and images.

Various aspects, embodiments, and examples of the inventions have been disclosed and described herein. Modifications, additions and alterations may be made by one skilled in the art without departing from the spirit and scope of the inventions as defined in the appended claims.

What is claimed is:

1. An improved method for processing a user question and retrieving data from a distributed system of networked data providers to provide an answer, the data provider having respective Application Program Interfaces (APIs), each API having respective defined attributes including an input format and at least one general input token, the method comprising the steps of:
   (a) receiving a text query derived from the user question;
   (b) accessing a first set of predefined questions in response to receipt of the text query, each predefined question being associated with a respective API for the data provider from which information to answer the respective predefined question can be obtained;
   (c) determining for a first predefined question from the first set a respective API match score, the API match score being a function of content in the text query and attributes of the respective API associated with the first predefined question;
   (d) repeating step (c) for at least one additional predefined question from the first set;
   (e) selecting a matching question from the first set based on the determined API match scores;
   (f) in response to the selection of a matching question issuing via the respective API associated with the matched question a data request to the data provider associated with the matched question, the data request being in the respective predefined input format and including data derived from text query content as a value for a first general input token;
   (g) receiving a reply to the data request;
   (h) generating the answer to the user inquiry including information from the reply; and
   (i) outputting the answer to the user.

2. The method of claim 1, further comprising the steps of:
   determining during the execution of at least one of steps (c) and (d) a second score for a second predefined question from the first set based on a scoring function; and
   selecting the second predefined question as the matching question if the second score exceeds a predefined score threshold.

3. The method of claim 2, wherein:
   each predefined question has a respective text alias;

the step of determining the second score comprising determining a measure of similarity between the text query and the respective text alias for the second predefined question.

4. The method of claim 1, step (c) further comprising the steps of:
identifying for each general input token for the respective API content in the text query that matches permitted values of the respective general input token;
mapping identified matched content in the text query to the respective corresponding general input tokens;
determining a matched amount value indicating a number of matched general input tokens for the respective API;
determining a missing amount value indicating a number of unmatched general input tokens for the respective API for which a value is required;
wherein the respective API match score is a function of the matched amount value and the missing amount value for the respective API.

5. The method of claim 4, further comprising the step of, prior to determining the missing amount value, assigning available default token values to general input tokens of the respective API that are not matched by content in the text query;
the determined missing amount value indicating a number of unmatched general input tokens for the respective API for which a value is required and a respective default token value has not been assigned.

6. The method of claim 1, step (c) further comprising the steps of:
identifying for any labels defined for the respective API label matches between the respective labels and content in the text query;
determining a label amount value based on the label matches for the respective API of the respective predefined question;
wherein the respective API match score is a function of the label amount for the respective API.

7. The method of claim 1, wherein the step (e) selecting a matching question based on the determined API match scores further comprises:
in response to a determination that a plurality of predefined questions are tied for highest API match score, displaying the tied predefined questions, and receiving as input a selection of the matching question from the tied predefined questions.

8. The method of claim 1, further comprising the steps of:
identifying a required input token for the respective API of the matching question that cannot be assigned a value based on text query content or predefined default values;
requesting user input of a value for the identified required input token via a user interface on a computer display;
receiving as input a specified value for the identified input token; and
using the specified value for the identified token in the data request.

9. The method of claim 8, wherein the step of requesting user input of a value for the identified required input token comprises the steps of:
accessing a historic record of input values for the identified required input token received from a user account from which the user inquiry was issued;
displaying on a computer display a data input field, a first user input interface displaying a first set of selectable input options, a second user input interface configured to display on activation by the user a second set of input options, and a third user input interface configured to display on activation by the user a third set of input options;
the first set of user input options comprising inputs in the historic record most frequently entered from the user account, the second set of user input options comprising inputs in the historic record not in the first set of user input options, and the third set of input options comprising options independent of the historic record.

10. The method of claim 9, the first user input interface comprising at least one selection button, each selection button indicating a respective input option from the first set of user input options; and the second user input interface comprising a pull down button, wherein the second set of user input options is displayed in response to selection of the pull down button.

11. The method of claim 10, the third user input interface comprising a search interface displayed in response to one of manual text entry in the text data input field or selection of a search button.

12. The method of claim 10, wherein the first user input interface is below the text data input field and the second user input interface is below the text data input field and adjacent to the first data input field.

13. The method of claim 1, the step (a) of providing access to the first set of predefined questions comprises selecting the first set of predefined questions as a subset of a second set of predefined questions based on access rights granted to a user account from which the user inquiry was issued.

14. The method of claim 1, the step of providing a text query for the user question comprising the step of applying text substitutions from a first vocabulary library to the user question.

15. The method of claim 14, the step of providing a text query for the user question further comprising applying text substitutions from a second vocabulary library to the user question after applying text substitutions from the first vocabulary library, wherein the first vocabulary library is linked to a first user group and the second vocabulary library is linked to a second user group, the second user group including the first user group.

16. An improved method for providing an answer a user question input to a computer system by a user, the computer system having access to a distributed system of networked data providers having respective Application Program Interfaces (APIs), the method comprising the steps of:
accessing a library of predefined questions, each predefined question having a text alias and being associated with a respective API for the data provider from which information to answer the respective predefined question can be obtained;
accessing a library of API definitions, each API definition specifying for the API respective attributes including an input format and at least one general input token;
selecting from the library of predefined questions a first set of predefined questions based on access rights of the user;
generating a text query from the user question;
identifying for the text query a matched question in the first set of predefined questions by:
(a) initiating a first computing thread operating to (i) determine respective string match scores for predefined questions in the first set, each respective string match score indicating a measure of similarity between the text query and the text alias for the respective predefined question, and (ii) select as the matching question the predefined question having the highest respective string match score exceeding a string match threshold;

(b) initiating a second computing thread operating to (i) determine respective API match scores for predefined questions in the first set, each respective API match score being a function of content in the text query and attributes of the respective API associated with the respective predefined questions, and (ii) select as the matching question the predefined question based on the respective API match scores;

in response to the earlier of matching question selection by the first computing thread and matching question selection by the second computing thread issuing a data request to the respective API for the matching question, the data request being in the respective predefined input format and including data derived from text query content as a value for a first general input token of the respective API;

receiving a reply to the data request;

outputting the answer in a predefined format and containing information extracted from the reply.

17. The method of claim 16, further comprising the step of terminating the second computing thread in response to a selection of the matching question by the first computing thread.

18. The method of claim 16, wherein determining an API match score for a particular predefined question comprises the steps of:

identifying for each general input token for the respective API of the particular predefined question content in the text query that matches permitted values of the respective general input token;

mapping identified matched content in the text query to the respective corresponding general input tokens;

determining a matched amount value indicating a number of matched general input tokens for the respective API of the particular predefined question;

assigning available default values to general input tokens of the respective API of the particular predefined question not matched by content in the text query, determining a missing amount value indicating a number of unmatched general input tokens for the respective API of the particular predefined question for which a value is required and which do not have an assigned default value;

the API match score being a function of the matched amount value and the missing amount value.

19. The method of claim 18, wherein determining an API match score for a particular predefined question further comprises the steps of:

identifying for any labels defined for the respective API of the particular predefined question label matches between the respective labels and content in the text query;

determining a label amount value based on identified label matches for the respective API of the respective predefined question;

wherein the respective API match score is a further function of the label amount for the respective API.

20. The method of claim 19, wherein each label has a respective length and the label amount is weighted based on the longest label length of the identified label matches for the respective API of the respective predefined question.

21. The method of claim 18, further comprising the step of determining an unused general token value for the respective API of the particular predefined question indicating a number of potential general tokens in the text query found to match permitted values of a general input token for an API associated with a predefined question in the first set of predefined questions other than the particular predefined question, and that are not matched to a general token for the respective API;

wherein the respective API match score is a further function of the unused general token value.

22. The method of claim 16, further comprising the steps of, prior to issuing the data request:

identifying a required input token for the respective API of the matching question that cannot be assigned a value based on text query content or predefined default values; and requesting user input of a specified value for the identified required input token via a user interface on a computer display; and receiving a the specified value for the identified required input token.

23. The method of claim 16, the step of generating a text query from the user question comprising applying text substitutions from a first vocabulary library to the user question.

24. The method of claim 23, the step of generating a text query from the user question further comprising applying text substitutions from a second vocabulary library to the user question after applying text substitutions from the first vocabulary library, wherein the first vocabulary library is linked to a first user group and the second vocabulary library is linked to a second user group, the second user group including the first user group.

25. A computer system for providing an answer to a user question submitted to the system by a user, the system comprising:

a computer processor;

an Input/Output (IO) system in communication with the computer processor and connectable to a network providing communication access to remote devices;

a machine readable memory and a data store;

the data store comprising:

predefined question definitions, each question definition specifying respective a text alias for the predefined question and an Application Program Interface (API) for the respective data provider from which information to answer the respective predefined question can be obtained; and API definitions, each respective API definition specifying respective attributes including an input format and at least one general input token for the API;

the machine readable memory holding computer program code comprising:

input query processing code to configure the processor to generate a text query from the user question;

matching question selection code comprising:

(i) query string matching code to configure the processor to determine for a first set of predefined questions respective string match scores indicating a measure of similarity between the text query and the text alias for the respective predefined question and select as the matching question the predefined question having the highest respective string match score if any strong match scores exceed a string match threshold; and (ii) query API matching code to configure the processor to determine for predefined questions in the first set of predefined questions respective API match scores using an as a function of content in the text query and attributes of the respective API associated with the respective predefined question and select the matching question from the first set of predefined questions based on the respective API match scores;

API interface code to configure the processor to generate for the earliest selected matching question from the query string matching code and the query API matching code a data request in the predefined input format for the respective API associated with the matching question and having as a value for a first general input token of the respective API data derived from text query content and cause the processor to send via the IO system the data request using the respective API; and answer builder code to configure the processor to receive a reply to the data request and to generate the answer to the user inquiry, the answer including information from the reply, and to output the answer to the user via the IO system.

26. The system of claim 25,

API definitions further specifying permitted values for general input tokens of the respective APIs and specifying at least one respective label for at least some of the defined APIs;

the query API matching code further comprising computer code to:

identify for each general input token for the respective API content in the text query that matches permitted values of the respective general input token; map identified matched content in the text query to the respective corresponding general input tokens;

determine a matched amount value indicating a number of matched general input tokens for the respective API; and determine a missing amount value indicating a number of unmatched general input tokens for the respective API for which a value is required;

identify labels defined for the respective API label matches between the respective labels and content in the text query and determine a label amount value based on the label matches for the respective API of the respective predefined question;

the respective API match score being a function of the matched amount value for the respective API, the missing amount value for the respective API, and the label amount value for the respective API.

27. The system of claim 26, the query API matching code further comprising computer code to assign available default token values to general input tokens of the respective API that are not matched by content in the text query; the determined missing amount value indicating a number of unmatched general input tokens for the respective API for which a value is required and a respective default token value has not been assigned.

28. The system of claim 26, the query API matching code further comprising computer code to determine an unused general token value for the respective API of the particular predefined question, the unused general token value indicating a number of potential general tokens in the text query found to match permitted values of a general input token for an API associated with a predefined question in the first set of predefined questions other than the particular predefined question, and that are not matched to a general token for the respective API;

the respective API match score being a function of the unused general token value.

29. The system of claim 25 further comprising a computer display, the data store further comprising historic data of values for API general input token received from users; the computer code further comprising code to configure the processor to:

identify a particular required input token for the respective API of the matching question that cannot be assigned a value based on text query content or predefined default values;

present a user interface on the display requesting input of a specified value for the particular required input token;

the user interface comprising a text data input field, a first user input interface area displaying a first set of selectable input options, a second user input interface area configured to display on activation by the user a second set of selectable input options, and a third user input interface area configured to display on activation by the user a third set of input options; the first set of user input options comprising values in the historic data most frequently entered for the particular required input token, the second set of user input options comprising values in the historic data for the particular required input token not in the first set of user input options, and the third set of input options comprising values for the particular required input token independent of the historic data; and receive the specified value via the user interface.

30. The system of claim 25, further comprising computer code to configure the processor to generate the first set of predefined questions as a subset of a second set of predefined questions based on access rights granted to a user account from which the user inquiry was issued.

* * * * *